(12) United States Patent
Buss et al.

(10) Patent No.: US 11,576,350 B2
(45) Date of Patent: Feb. 14, 2023

(54) DOG TOY ASSEMBLY WITH ELONGATED STICK HAVING TOY ATTACHED ON END AND TOY ATTACHMENTS AND STICK MOUNTS THEREOF

(71) Applicants: Timothy J. Buss, Turner Valley (CA); Jason R. Buss, Calgary (CA)

(72) Inventors: Timothy J. Buss, Turner Valley (CA); Jason R. Buss, Calgary (CA)

(*) Notice: Subject to any disclaimer, the term of this patent is extended or adjusted under 35 U.S.C. 154(b) by 995 days.

(21) Appl. No.: 16/364,414

(22) Filed: Mar. 26, 2019

(65) Prior Publication Data

US 2019/0307102 A1 Oct. 10, 2019

Related U.S. Application Data

(60) Provisional application No. 62/652,719, filed on Apr. 4, 2018.

(51) Int. Cl.
*A01K 15/02* (2006.01)

(52) U.S. Cl.
CPC .................................. *A01K 15/025* (2013.01)

(58) Field of Classification Search
CPC .................................................... A01K 15/025
See application file for complete search history.

(56) References Cited

U.S. PATENT DOCUMENTS

| 3,877,736 | A | * | 4/1975 | Zauskey | A01K 97/26 |
| | | | | | 289/17 |
| 4,003,595 | A | * | 1/1977 | Fano | A01K 23/005 |
| | | | | | 294/1.5 |
| 4,324,220 | A | * | 4/1982 | Joelson | F41B 3/02 |
| | | | | | 124/18 |
| 5,186,197 | A | * | 2/1993 | Lavine | A45B 19/00 |
| | | | | | 135/25.4 |

(Continued)

FOREIGN PATENT DOCUMENTS

| WO | WO-2015172204 A1 * | 11/2015 | ............ A01K 15/025 |
| WO | WO-2017129993 A1 * | 8/2017 | .............. A01K 15/02 |

OTHER PUBLICATIONS

Gunn, Janice; Transcript of "The Flirt Pole—Training Ideas"; published on Oct. 30, 2014; downloaded from YouTube https://www.youtube.com/watch?v=GILCgZOYD2E on Mar. 26, 2019.

*Primary Examiner* — Magdalena Topolski
*Assistant Examiner* — Edgar Reyes
(74) *Attorney, Agent, or Firm* — ATMAC Patent Services Ltd.; Andrew T. MacMillan

(57) ABSTRACT

A dog toy assembly includes an elongated stick with a toy attachment on an end. A toy is attached to the toy attachment. By holding and manipulating the stick during play, a user obtains leverage to accurately and quickly control the toy. The toy attachment may be removably attached to the stick, may be rotatable, and may include loops, hooks, concave sections, and rings. A locking sleeve may be included to keep the toy attached. The stick may include a (Continued)

handle and may be flexible. A leg strap including an eyelet through which the stick passes may be worn by the user to provide a pivot point and allow one-handed play while seated. Door mounts, floor mounts, seat mounts, and support racks include stick holders to give the user a break while the dog continues to play. The toy attachment and toy itself may be fully chewable and removable.

20 Claims, 15 Drawing Sheets

(56) References Cited

U.S. PATENT DOCUMENTS

| | | | | |
|---|---|---|---|---|
| 5,581,929 A * | 12/1996 | Molloy | ................... | A01K 77/00 43/12 |
| 5,961,406 A * | 10/1999 | Hass | ................... | A63B 43/007 473/576 |
| 6,171,200 B1 * | 1/2001 | Camp | ................... | A63B 67/08 473/576 |
| 6,629,510 B1 * | 10/2003 | Robkin | ................ | A01K 15/025 119/711 |
| 8,181,606 B1 * | 5/2012 | Kirschbaum | ........ | A01K 15/025 119/707 |
| 8,944,011 B2 * | 2/2015 | Kirschbaum | ........ | A01K 15/025 119/707 |
| 8,978,591 B2 * | 3/2015 | Cogswell | .............. | A01K 15/025 119/708 |
| 9,585,367 B2 * | 3/2017 | Hill | ........................ | A01K 15/02 |
| 9,623,304 B2 * | 4/2017 | Clarke | ................... | A63B 59/20 |
| 10,314,291 B2 * | 6/2019 | Chen | .................... | A01K 15/027 |
| 2006/0048719 A1 * | 3/2006 | Myers | .................. | A01K 15/026 119/710 |
| 2007/0215063 A1 * | 9/2007 | Simpson | .............. | A01K 15/026 119/708 |
| 2008/0004140 A1 * | 1/2008 | Matsumoto | .......... | A01K 15/025 473/513 |
| 2008/0282993 A1 * | 11/2008 | Hoehn | ................... | A01K 15/02 119/712 |
| 2010/0127521 A1 * | 5/2010 | Thibault | ................ | A63B 47/02 294/19.2 |
| 2010/0279907 A1 * | 11/2010 | Gelin | .................... | A61K 8/9789 510/129 |
| 2012/0006309 A1 * | 1/2012 | Levin | ................... | A01K 39/014 124/5 |
| 2012/0031385 A1 * | 2/2012 | Fisher | ...................... | F41B 3/04 124/5 |
| 2012/0318209 A1 * | 12/2012 | Christianson | ........ | A01K 15/025 119/707 |
| 2013/0192535 A1 * | 8/2013 | Smith | .................. | A01K 15/025 119/707 |
| 2015/0208629 A1 * | 7/2015 | Galhardo | ............. | A01K 87/025 43/18.1 CT |

* cited by examiner

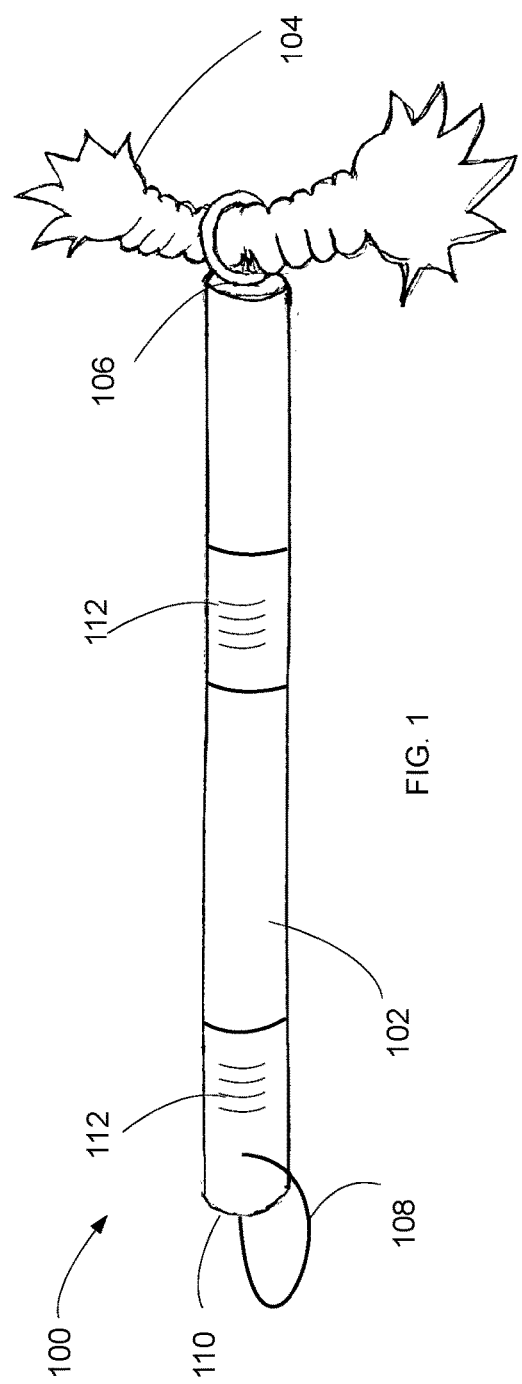
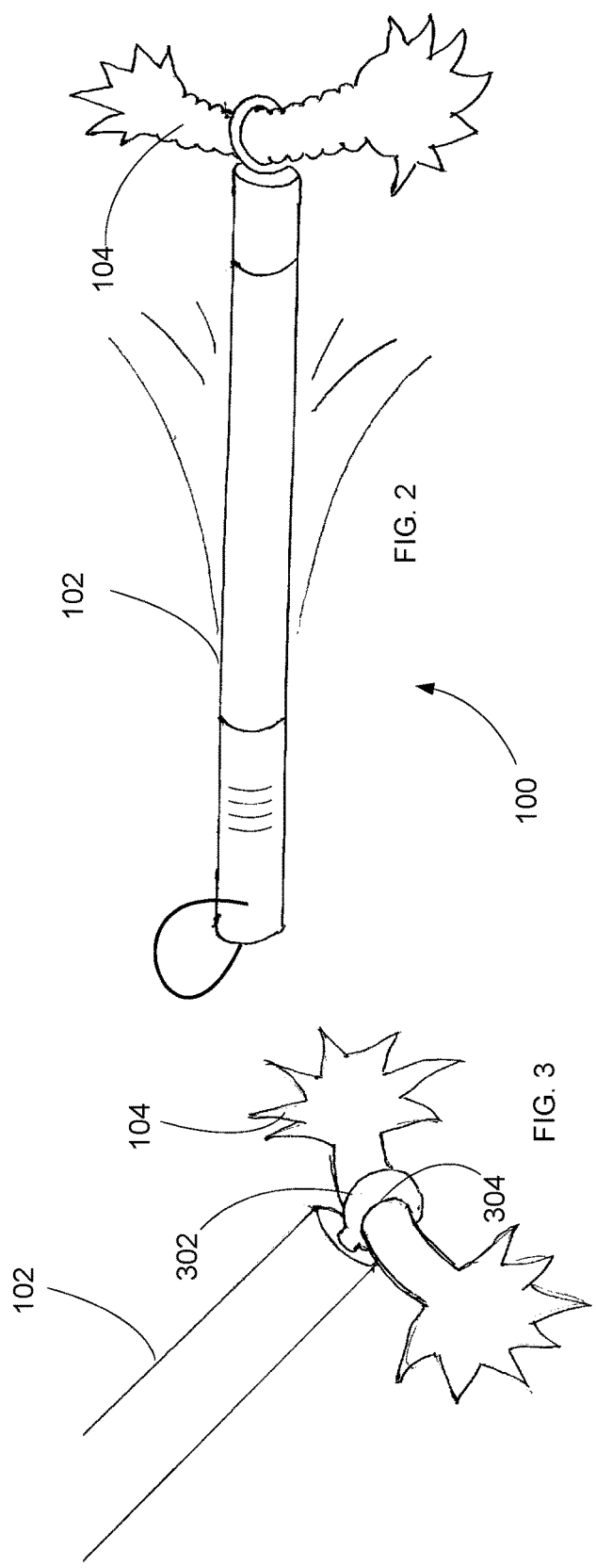

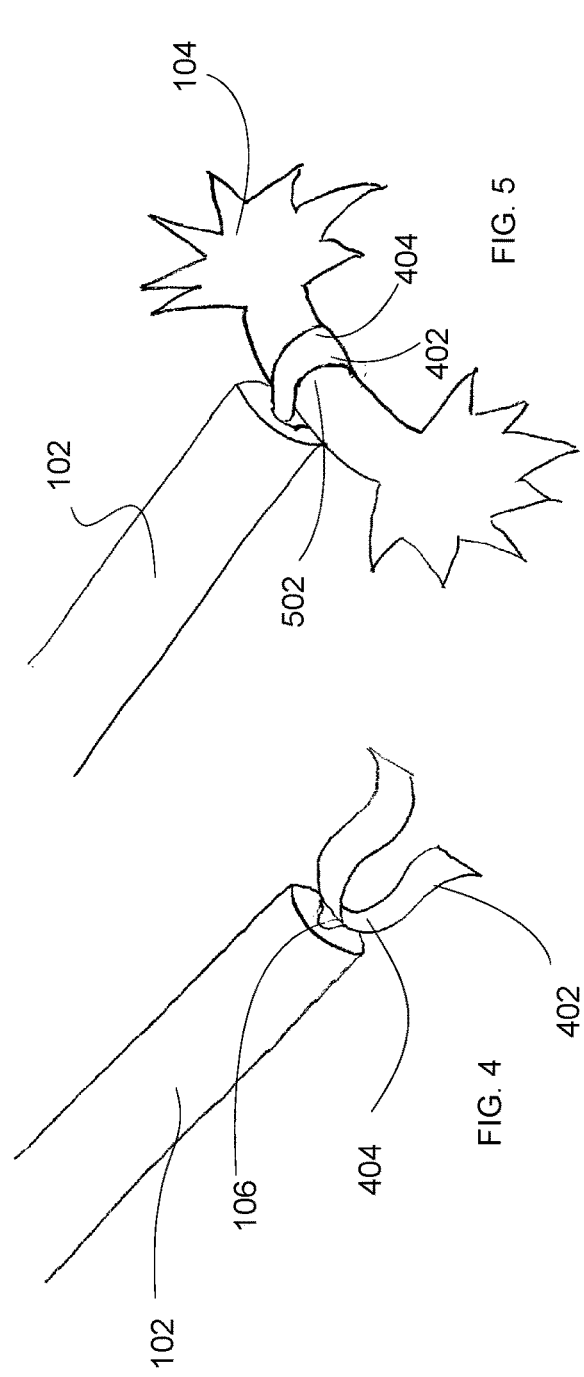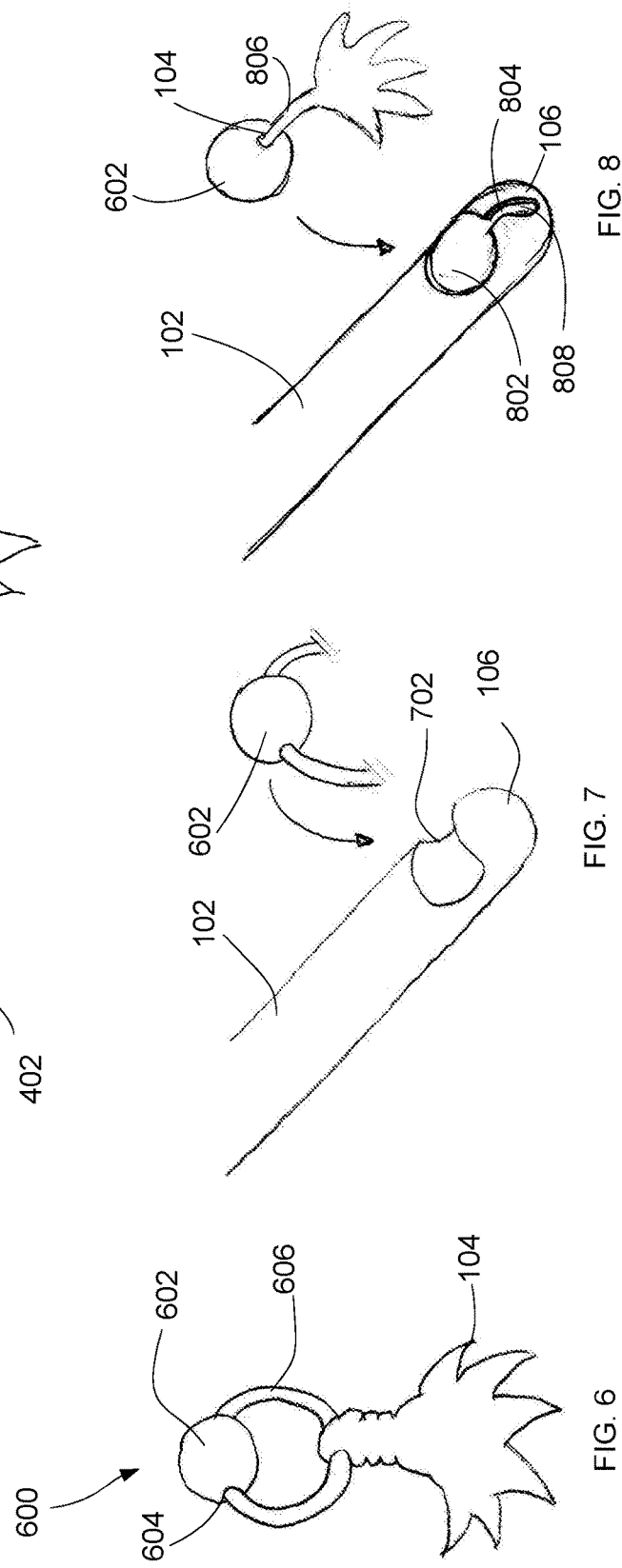

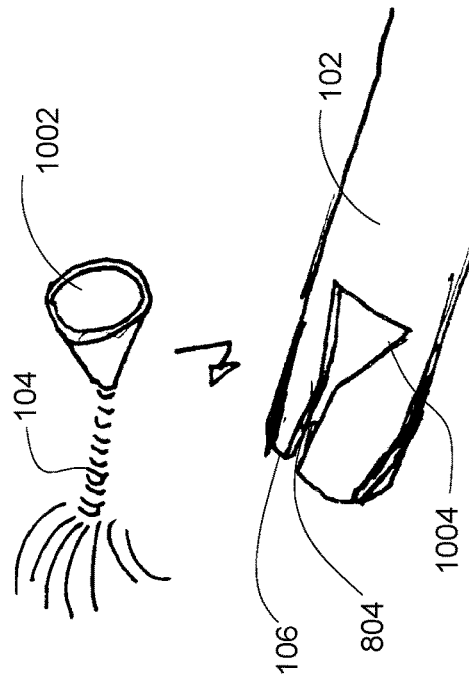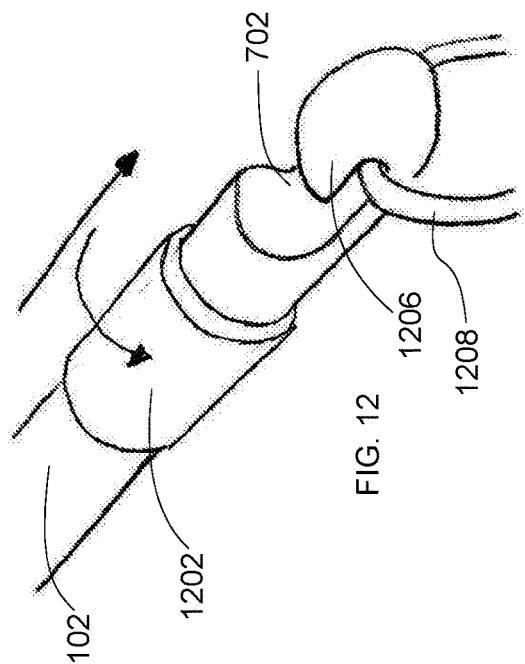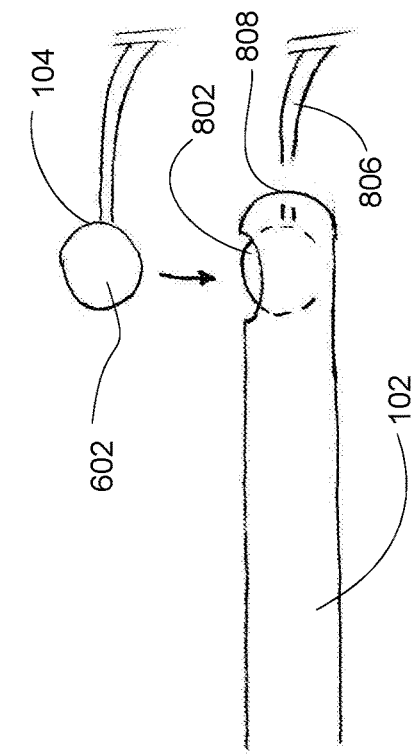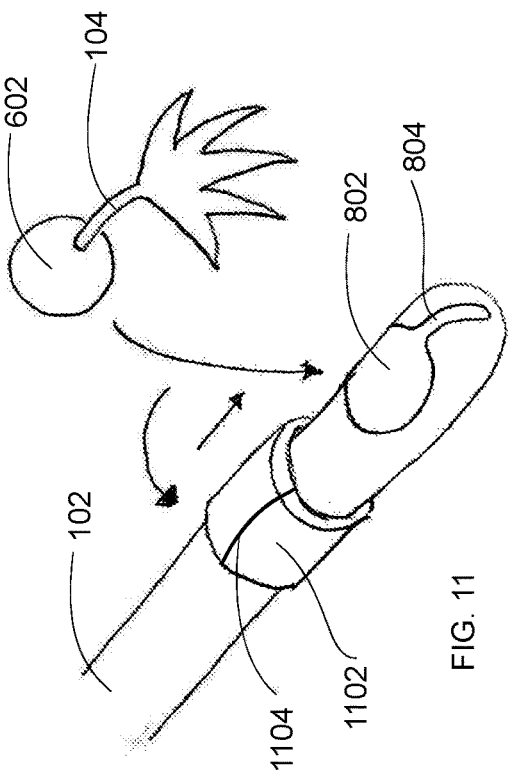

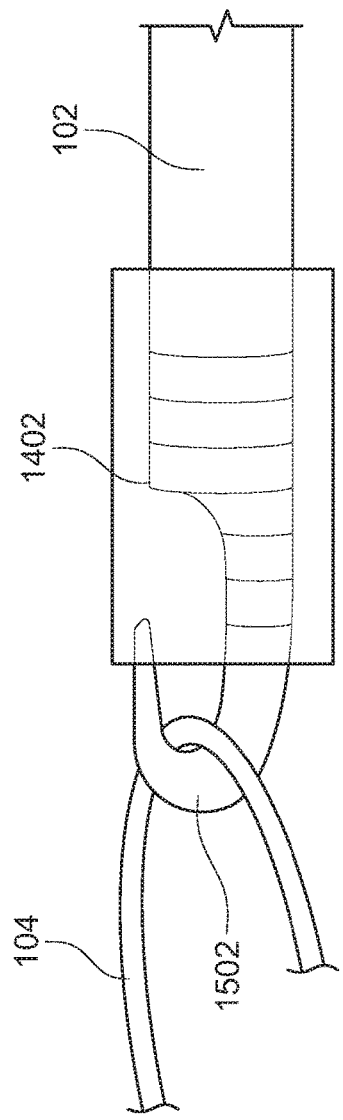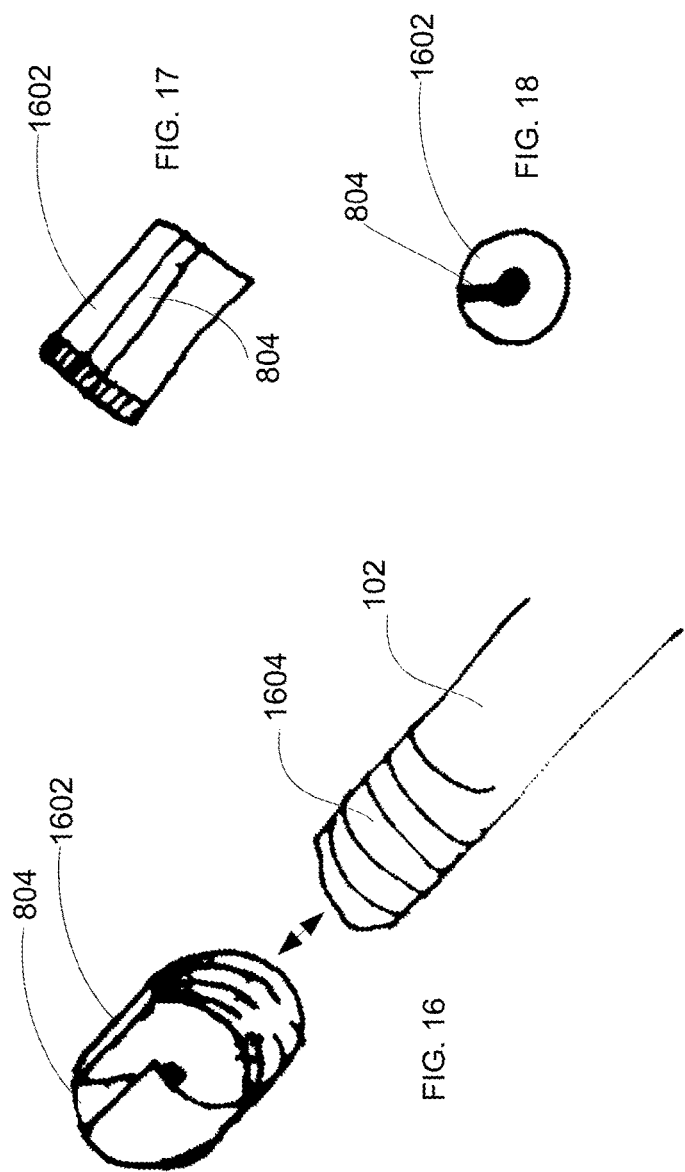

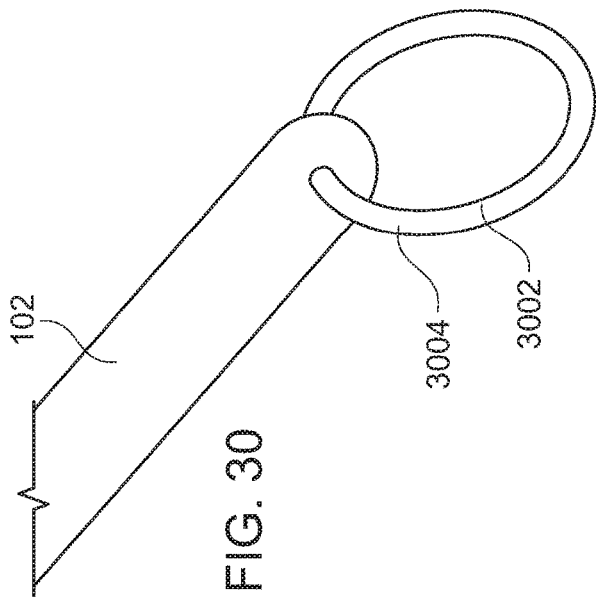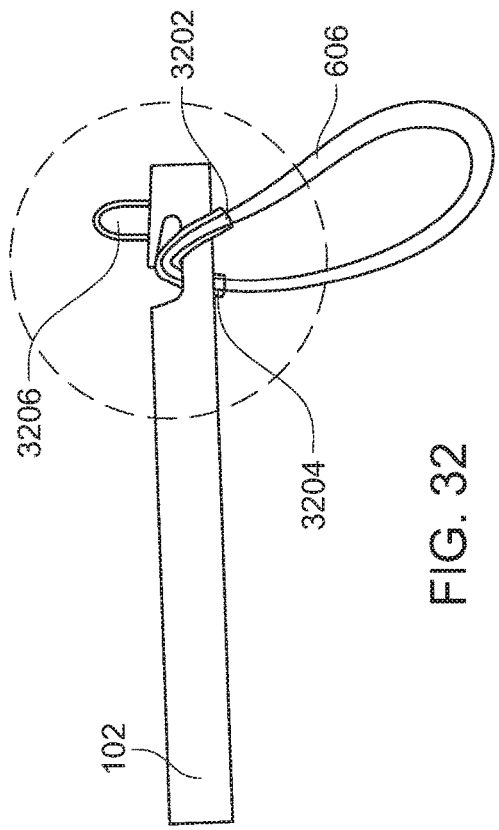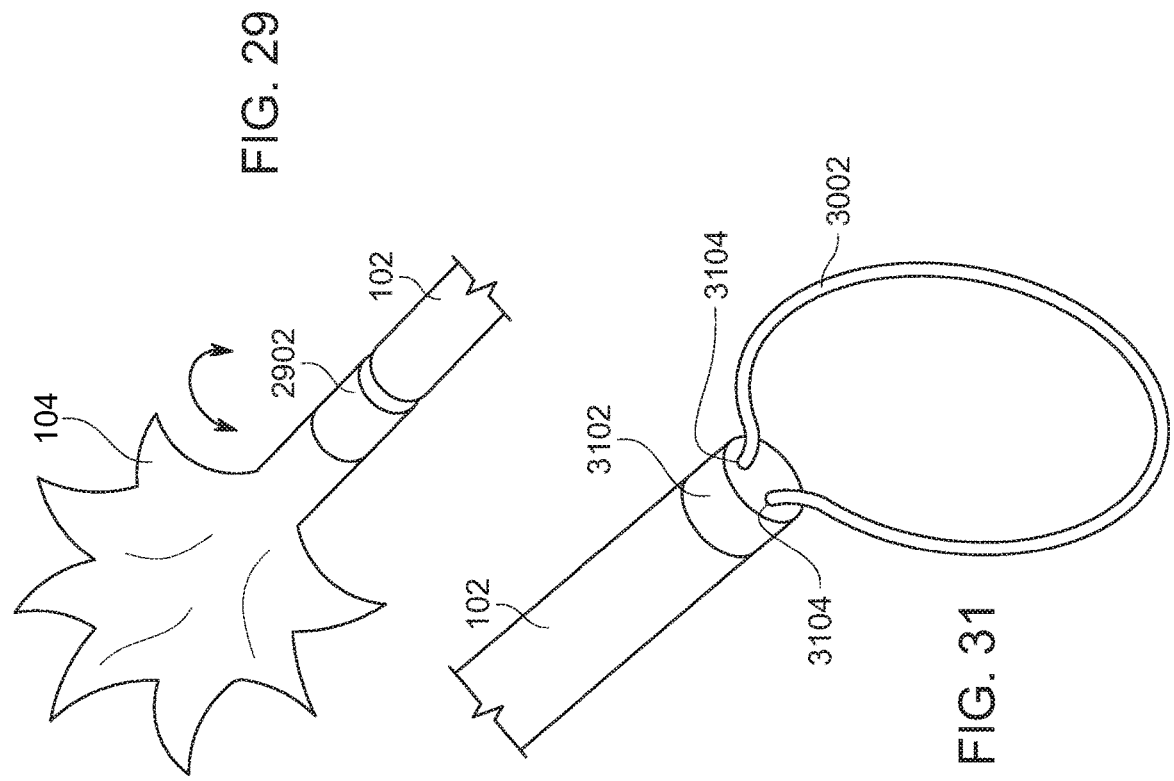

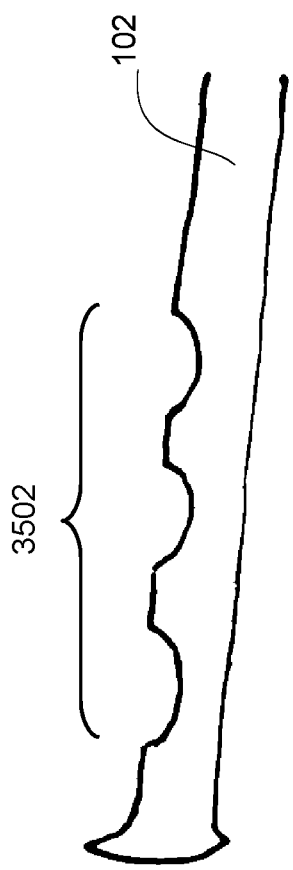
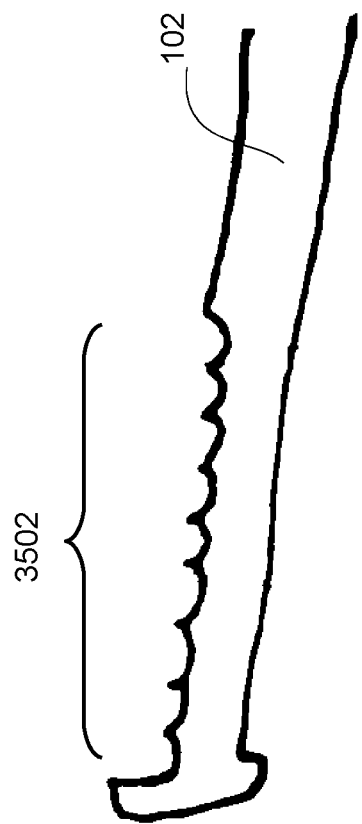
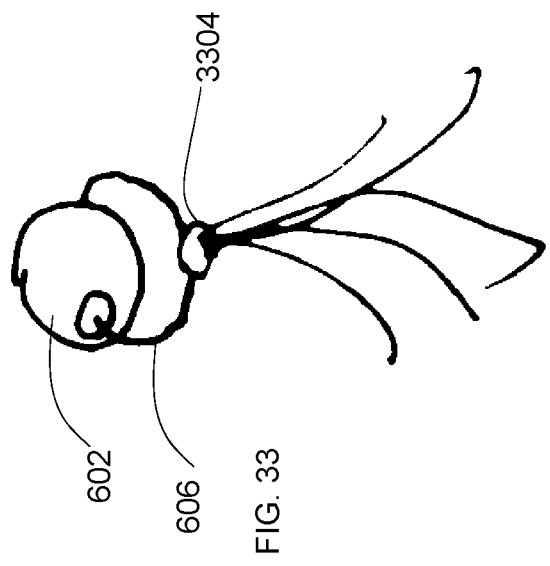
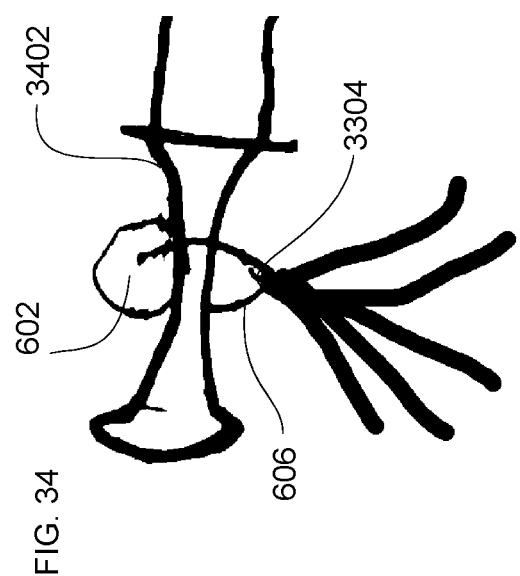

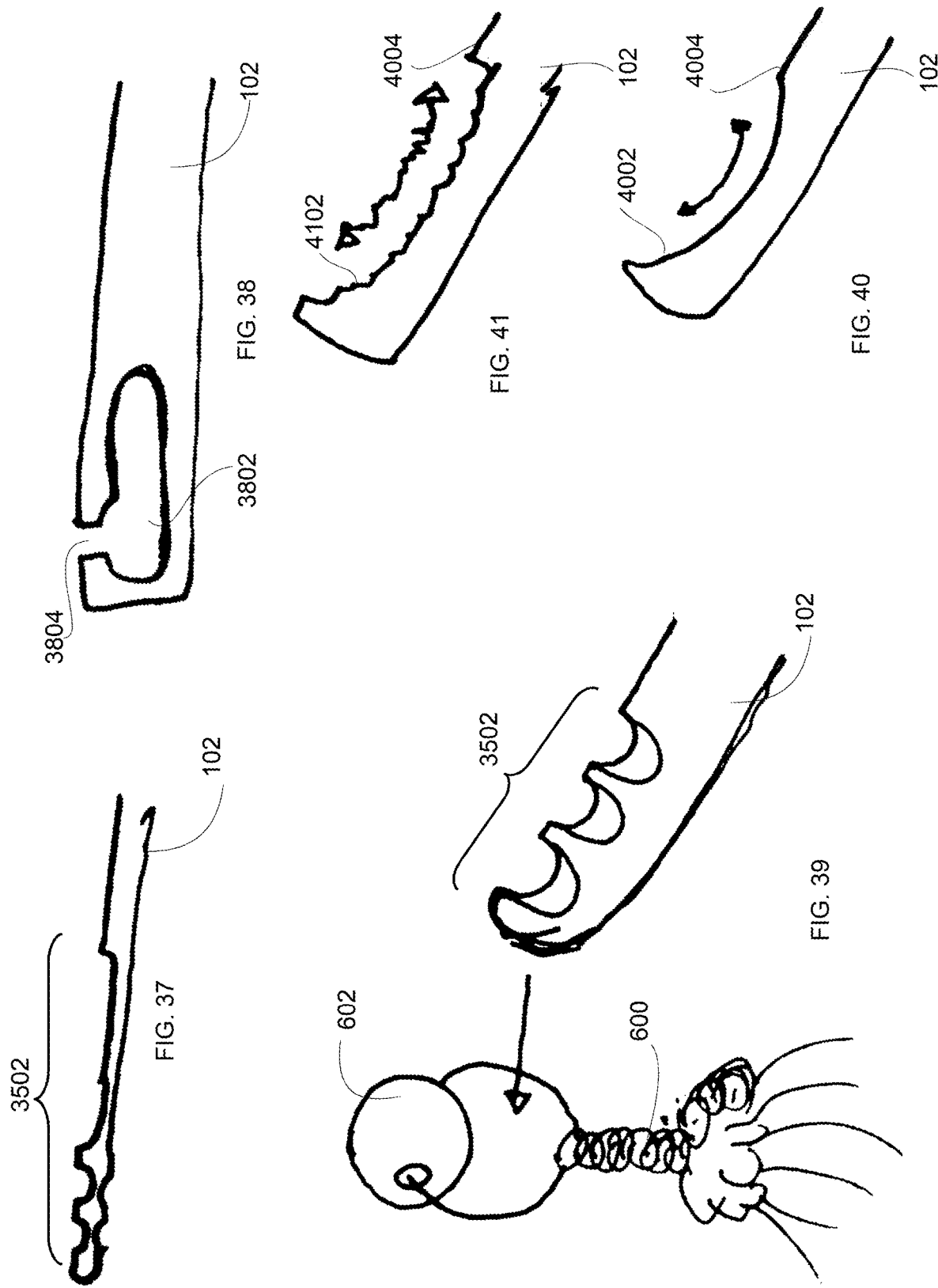

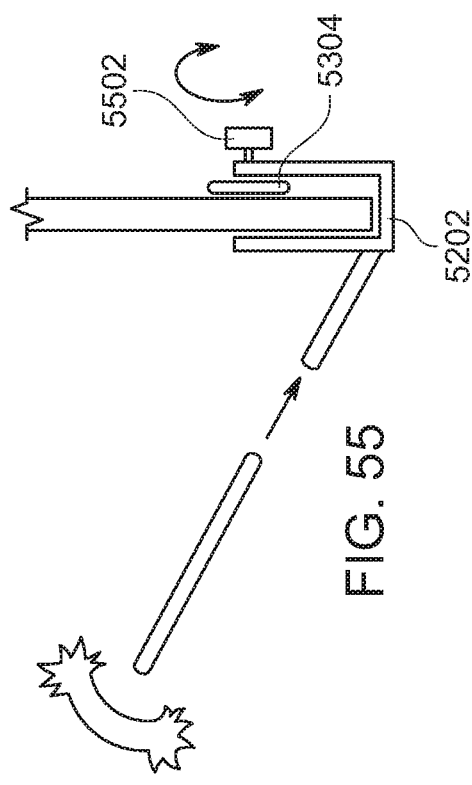
FIG. 55
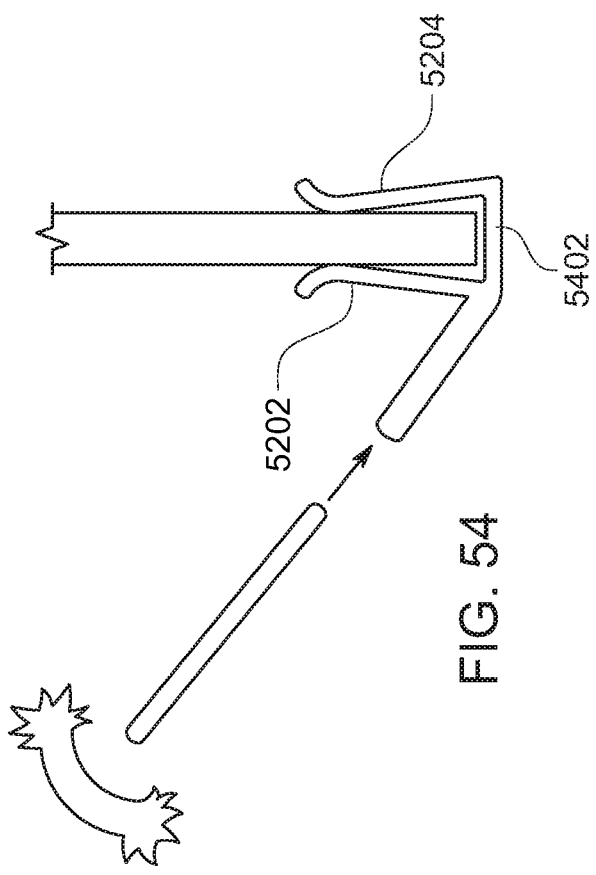
FIG. 54
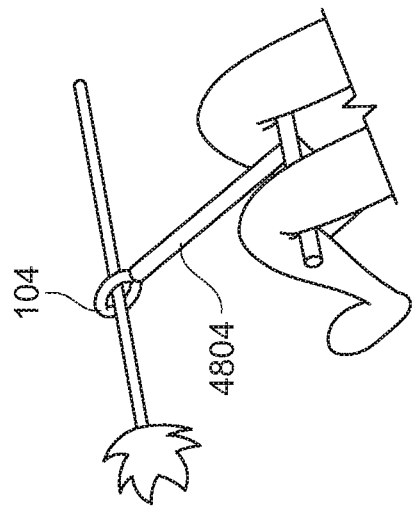
FIG. 57
FIG. 56

DOG TOY ASSEMBLY WITH ELONGATED STICK HAVING TOY ATTACHED ON END AND TOY ATTACHMENTS AND STICK MOUNTS THEREOF

CROSS-REFERENCE TO RELATED APPLICATIONS

This application claims the benefit of priority of U.S. Provisional Application No. 62,652,719 filed Apr. 4, 2018, which is incorporated herein by reference.

BACKGROUND OF THE INVENTION

(1) Field of the Invention

The invention pertains generally to pet toys. More specifically, the invention relates to toys for playing with pets such as dogs that enjoy games involving biting, shaking, chewing and chasing.

(2) Description of the Related Art

Pet dogs often do not get the activity levels they want and need. Dogs must be challenged, both mentally and physically. Common solutions to the problem of how to exercise pet dogs include outdoor fetch-type games using balls, frisbees, or other toys. However, these games require a large amount of space, which may not be available in the immediate vicinity of the owner's residence, especially if the owner lives in an area with bylaws limiting locations where dogs may run off leash. Daily on-leash walks are recommended, but, unfortunately, not every dog can get a daily walk. The weather or any number of factors such as a leg injury to the owner or other mobility restrictions may leave a dog without access to regular outdoor exercise.

Effective indoor exercise is typically challenging for dogs and owners alike. Most dogs love toys and there are a large variety available in pet stores. Some incorporate food, some incorporate smells, others incorporate squeakers. Although new toys can help keep a dog mentally stimulated, dogs often quickly bore of solo-play toys. Furthermore, toys generally do not satisfy the exercise requirements of most dogs without the owner actively participating in play.

Playing indoor games in a manner that meets the exercise requirements of the dog can be near impossible for some owners. The limited space available in most owners' homes is not sufficient for many dogs to get running at top speed. Fetch games are therefore not that useful for indoor exercise. Likewise, most dogs are faster and have more stamina than their owners. Thus, for truly active indoor play, usually the owner tires out before the dog has received all the exercise it needs.

BRIEF SUMMARY OF THE INVENTION

According to an exemplary embodiment of the invention there is disclosed a dog toy assembly that includes an elongated stick with a toy attachment on one end. A dog toy is attached to the toy attachment. By holding and manipulating the stick during play, a user obtains leverage in order to accurately and quickly control the location of the toy. The toy attachment may be a separate component that is removably attached to the stick and may be rotatable for further movement during play. The toy attachment may include loops, hooks, concave sections, and rings. A locking sleeve may be included on the stick or toy attachment to keep the toy attached during play, or the toy may be enabled to be removed during play if desired. The stick may include a handle and may also be flexible in order to accelerate the toy in an elastic motion. A leg strap may include an eyelet through which the stick passes in order to provide a pivot point and allow one-handed play even while the user is seated. Door mounts, floor mounts, seat mounts, and support racks include stick holders and can be used to give the user a break while the dog continues to play. The toy attachment and/or toy itself may also be fully chewable and removable to give to the dog after play is finished.

According to an exemplary embodiment of the invention there is disclosed an assembly where the attachment includes a strap with fasteners for attaching the toy to the attachment.

According to an exemplary embodiment of the invention there is disclosed an assembly that includes a handle coupled to the rigid stick. The handle may be a moveable handle. The handle includes a sleeve, and the rigid stick passes through the sleeve such that the handle can be moved by a user along at least a portion of a length of the rigid stick.

According to an exemplary embodiment of the invention there is disclosed an assembly where the toy is made of a chewable material. The rigid stick may also be made of a chewable material. An end of the rigid stick may have a lanyard. The rigid stick may be between two to five feet in length.

According to an exemplary embodiment of the invention there is disclosed an assembly where the attachment includes a spring to which the toy is attached. The attachment may have at least one rotating union allowing rotation of the toy around at least one axis. The attachment may include a hook-shaped stick end, and the hook-shaped stick end holds a first part of the toy. The attachment may have a notch around a perimeter of the rigid stick for attaching looped toys.

According to an exemplary embodiment of the invention there is disclosed an assembly, where the attachment is a claw-shaped catch including two side channels and a front channel. The assembly further includes a corded toy having, a compressible ball, and a single cord extending from the compressible ball. When the corded toy is secured in the attachment, the compressible ball is compressed within the claw-shaped catch and the single cord extends through the front channel.

According to an exemplary embodiment of the invention there is disclosed an assembly, where the attachment is a claw-shaped catch including two side channels and a front channel. The assembly further includes a dual corded toy having a compressible ball, and dual cords extending from opposite sides of the compressible ball. When the dual corded toy is secured in the attachment, the compressible ball is compressed within the claw-shaped catch and each of the dual cords respectively extends through one of the two side channels.

According to an exemplary embodiment of the invention there is disclosed an assembly, where the attachment comprises a padlock design for attaching the toy, the padlock design has a U-shaped section which is opened by a user disengaging a locking mechanism, and the user secures a part of the toy within the U-shaped section and locks the U-shaped section after inserting the part of the toy.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof:

FIG. 1 illustrates a perspective view of a dog toy assembly comprising an elongated stick and a toy attached to an end of the stick according to an exemplary embodiment.

FIG. 2 illustrates a perspective view of the dog toy assembly of FIG. 1 illustrating flexibility of the elongated stick according to an exemplary embodiment.

FIG. 3 illustrates a perspective view of a toy attachment comprising a fish eye screw mounted on the toy end of the elongated stick according to an exemplary embodiment.

FIG. 4 illustrates a perspective view of a toy attachment comprising straps with fasteners to secure a toy to the end of the elongated stick according to an exemplary embodiment.

FIG. 5 illustrates a dog toy attached to the sick utilizing the toy attachment and straps of FIG. 4.

FIG. 6 illustrates a dog toy incorporating a rubber ball according to an exemplary embodiment.

FIG. 7 illustrates a perspective view of a toy attachment comprising a grove for holding a rubber ball according to an exemplary embodiment.

FIG. 8 illustrates a perspective view of a toy attachment comprising a rubber ball incorporated on the toy being inserted and held in catch on the stick where a single cord channel extends from the catch to the end of the stick according to an exemplary embodiment.

FIG. 9 illustrates a side view of the stick of FIG. 8 both before and after ball insertion.

FIG. 10 illustrates a perspective view of a toy attachment comprising a cone-shaped section of the toy held in a corresponding cone-shaped catch on the stick according to an exemplary embodiment.

FIG. 11 illustrates a perspective view of a toy attachment comprising a catch with front cord channel and a sleeve lock securing an attachment of the toy within the catch according to an exemplary embodiment.

FIG. 12 illustrates a sliding solid sleeve that does not include a split on the ring according to an exemplary embodiment.

FIG. 15 illustrates a side view of a toy attachment comprising a hook-shaped stick end with a threaded sleeve lock securing a toy on the hook according to an exemplary embodiment.

FIG. 16 illustrates a perspective view of a toy attachment comprising a threaded end cap for attachment to a threaded end of the stick according to an exemplary embodiment.

FIG. 17 illustrates a side view of the end cap of FIG. 16,

FIG. 18 illustrates an end view of the end cap of FIG. 16.

FIG. 29 illustrates a perspective view of a toy attachment comprising a second rotating union allowing toy rotation around a plurality of different axis during play according to an exemplary embodiment.

FIG. 30 illustrates a perspective view of a toy attachment comprising an integrated strap loop on the stick end for toy attachment according to an exemplary embodiment.

FIG. 31 illustrates a perspective view of a toy attachment comprising a strap loop cap on the stick end for toy attachment according to an exemplary embodiment.

FIG. 32 illustrates a cross section view of toy attachment comprising a notched-out hook section on the stick end for attaching a looped toy with a rubber friction surface according to exemplary embodiment.

FIG. 33 illustrates a perspective view of a looped toy with rubber ball attachment according to an exemplary embodiment.

FIG. 34 illustrates a side view of a toy attachment comprising a concave stick end for attaching the looped toy with rubber ball of FIG. 33.

FIG. 35 illustrates a side view of a toy attachment comprising a plurality of concave sections along the stick side for gripping the looped toy with rubber ball of FIG. 33.

FIG. 36 illustrates a side view of a toy attachment comprising a plurality of concave sections along the stick side for providing a rumble effect against the rubber ball of FIG. 33.

FIG. 37 illustrates a side view of a toy attachment comprising a plurality of concave sections around the circumference of the stick for providing either the gripping or rumble effects as described for FIG. 35 and FIG. 36.

FIG. 38 illustrates a cross section view of a toy attachment comprising a hollowed-out section within the stick end according to an exemplary embodiment.

FIG. 39 is a perspective view of a toy attachment comprising a plurality of concave sections along a stick side according to an exemplary embodiment.

FIG. 40 illustrates a side view of a toy attachment comprising a smooth concave section on a single side of the stick end according to an exemplary embodiment.

FIG. 41 illustrates a side view of a toy attachment comprising a ridged concave section on a single side of the stick end according to an exemplary embodiment.

FIG. 54 illustrates a side view of a door mount stick attachment having inwardly biased side plates according to an exemplary embodiment.

FIG. 55 illustrates a side view of the door mount stick utilizing rubber stopper bolts while attached to the door.

FIG. 56 illustrates a perspective view of a seat mount stick attachment according to an exemplary embodiment.

FIG. 57 illustrates a perspective view of the seat mount stick attachment of FIG. 56 while in use by a user during play according to an exemplary embodiment.

DETAILED DESCRIPTION

Figure 14:
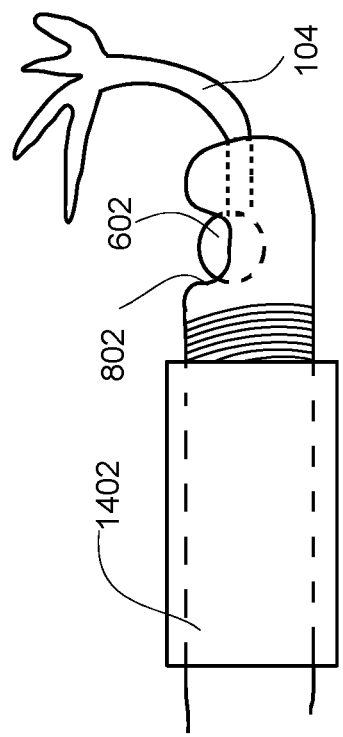
FIG. 14 illustrates a side view of a toy attachment comprising a threaded locking sleeve in the open position according to an exemplary embodiment.

FIG. 1 illustrates a perspective view of a dog toy assembly 100 comprising an elongated stick 102 and a toy 104 attached to an end of the stick 106 according to an exemplary embodiment. A lanyard 108 is attached to an opposite end 110 of the stick 102 for safety, and one or more gripping surfaces 112 are provided on the stick 102 to facilitate a user holding and maintaining control of the dog toy assembly 100. The dog toy assembly 100, also referred to herein in short form as a dog toy 100, may be utilized by the user to exercise a dog in a confined space such as a living room of a residential home. During play, the user gripping the stick 102 of the dog toy 100 at two positions such as the end of the stick 110 with the lanyard looped 108 around one wrist and the other hand near the middle of the stick has leverage to quickly change the position of the toy. Depending on the user's hand positions, small movements by the user can result in large movements of the toy 104 attached at the end of the stick 106. Likewise, the user can quickly change the position of the toy 104 in order to prevent the dog from being able to grab the toy 104 during play thereby the toy 104 acts as a lure for the animal. Cooperative play with a toy 104 attached on the end of the stick 106 beneficially results in the user's energy excretion requirements being lowered while the dog's energy and focus requirements are increased in comparison with play using the toy 104 alone.

The elongated stick 102 of the dog toy assembly 100 in this embodiment is approximately three to four feet and is formed using rigid material that is safe for dogs to chew such as wood or plastic. In this embodiment, the elongated stick is a rigid stick 102. The rigid stick 102 is formed such that under lateral forces equal to a weight of the animal at a first end 106 of the rigid stick 102 while the rigid stick 102 is held fixed in position at a second end 110 opposite the first end 106 deflects less than two percent of a length of the rigid stick.

FIG. 2 illustrates a perspective view of the dog toy assembly 100 of FIG. 1 illustrating flexibility of the elongated stick 102 according to an exemplary embodiment. In the embodiment of FIG. 2, the elongated stick 102 is constructed of flexible material such as flexible plastic or metal. Similar to a fishing pole, the elongated stick 102 flexes under the lateral forces applied during play. Likewise, the natural tendency of the stick 102 to return to the neutral position when the forces are removed allows additional movement of the toy 104 during play with minimal effort excreted by the user.

FIG. 3 illustrates a perspective view of a toy attachment comprising a fish eye screw 302 having an eye 304 mounted on the toy end 104 of the elongated stick 102 according to an exemplary embodiment. The toy attachment directly secures the toy 104 to the rigid stick 102 such that each linear movement of the rigid stick 102 results in a corresponding linear movement of the toy 104. The toy 104 in this embodiment is a rope toy that has passed through the eye of the screw 302 with knots tied on both sides of the rope toy in order to prevent the rope toy from being removed from the eye screw 302. The eye screw 302 may be formed of metal in some embodiments and a protective cover may be applied to the metal in order to prevent damage to the dog's teeth if the dog bites the eye screw 302. In other embodiments, the eye screw 302 itself is made of material that is safe and durable for dog bites such as dense rubber and low rigidity, flexible plastics.

FIG. 4 illustrates a perspective view of a toy attachment 402 comprising straps 404 with fasteners such as hook-and-loop fasteners (e.g., Velcro® brand) or other desired fasteners allowing the straps 404 to secure a toy 104 to the end of the elongated stick 106 according to an exemplary embodiment. The straps 402 with fasteners of this embodiment allows many toys 104 of random shapes and sizes to be attached to the end of the stick 106.

FIG. 5 illustrates a dog toy 104 attached to the stick 102 utilizing the toy attachment 402 and straps 404 of FIG. 4. As illustrated, the fasteners are secured around the middle section 502 of the toy 104.

FIG. 6 illustrates a dog toy 600 incorporating a rubber ball 602 according to an exemplary embodiment. The rubber ball 602 has a hole 604 drilled through it and a corded rubber loop 606 is passed through the hole 604 and secures a rope toy to the loop 606.

FIG. 7 illustrates a perspective view of a toy attachment comprising a groove 702 for holding a rubber ball 602 according to an exemplary embodiment. The toy attachments are located along a length of the rigid stick closer to an end 106 of the rigid stick 102 than to a middle of the rigid stick. In this example, the rubber ball 602 of the toy 600 of FIG. 6 is inserted and held in the corresponding groove 702 of the stick 102. The groove 702 matches the shape and curvature of the rubber ball 602 but may be of slightly smaller diameter than the rubber ball 602 in order to securely cup and hold the rubber ball 602 in the groove 702 as a result of friction forces. The toy 104 may be a loop 606 of rope or other material that passes through the rubber ball 602 such that the rubber ball 602 is in the middle of the toy 104. The cords 606 of the toy 600 on either side of the rubber ball 602 exit from two sides of the stick 102 while the ball 602 is held in the groove 702. The groove 702 is cut with side channels to thereby allow the cords on each side of the rubber ball to exit from either side of the grove.

FIG. 8 illustrates a perspective view of a toy attachment comprising a rubber ball 602 incorporated on the toy 104 being inserted and held in catch 802 on the stick 102 where a single cord channel 804 extends from the catch 802 to the end of the stick 102 according to an exemplary embodiment. The embodiment of FIG. 8 is particularly well-suited for toys 104 that have the rubber ball 602 mounted on one end of the toy 104 rather than a middle portion. To secure the toy 104 to the stick 102, the ball 602 is inserted into the catch 802 on the stick 102 and the toy cord 806 exits from the front end 802 of stick 102 through the cord channel 804. For greater clarity, FIG. 9 illustrates a side view of the stick 102 of FIG. 8 showing the ball 602 of the toy 104 prior to insertion into the stick 102, along with a side cross-sectional view showing in dashed line the ball 602 of the toy 104 inserted in the stick 102 and the toy cord 806 exiting the front of the stick through the cord channel.

In addition to a rubber ball 600, the toy attachment of FIG. 8 and FIG. 9 may also be utilized to secure toys with a rope knot being inserted and held within a catch 802 on the stick 102 where the cord of the rope toy exits the front 808 of the stick 102 through a cord channel 804. In general, one or more grooves on the stick 102 can be utilized to secure and hold either a rubber ball 602 on a toy 104 or a rope knot on the toy 104 or any other section of the toy 104 that has a width that fits within the groove 702 but prevents the toy 104 from slipping out of the groove 702 or its cord channel(s) 804.

FIG. 10 illustrates a perspective view of a toy attachment comprising a cone-shaped section 1002 of the toy 104 held in a corresponding cone-shaped catch 1004 on the stick 102 according to an exemplary embodiment. The cone-shaped catch 1004 allows the user to insert the cone-shaped attachment 1002 into catch 1004. In some embodiments, the cord channel 804 extending from the catch 1004 may be narrow enough to prevent the cone-shaped attachment 1002 from being removed. However, the cone-shaped attachment 1002 may be formed of flexible material such that, when forces exceeding a desired threshold are exceeded during play, the cone-shaped attachment 1002 will lose its cone shape as it is pulled through the cord channel 804. Other shapes of attachments on different toys in addition to balls, rope knots, cone-shaped attachments 1002 may be utilized in similar manners. Regardless of the shape or size of the attachments, the material of the attachment may be formed of a flexible material allowing the attachment to be pulled out the front end 106 of the stick 102 with enough force is applied.

FIG. 11 illustrates a perspective view of a toy attachment comprising a catch 802 with front cord channel 804 and a sleeve lock 1102 securing an attachment of the toy 104 within the catch 802 according to an exemplary embodiment. In this example, the attachment of the toy 104 again includes a rubber ball 602 inserted and held within the catch 802. In order to prevent the rubber ball 602 from being removed from the catch 802 during play, the sleeve lock 1102 is moved by the user to cover the catch 802 such that the ball 602 is blocked by the sleeve 1102 and cannot exit the catch 802. The sleeve lock 1102 in this embodiment is a split ring 1104 rotatable and moveable by the user about the elongated stick 102. The split ring 1104 may naturally have a diameter that is less than the diameter of the stick 102 such that split ring 1104 grips the stick 102 and friction forces hold it in position.

FIG. 12 illustrates a sliding solid sleeve 1202 that does not include a split on the ring according to an exemplary embodiment. The operation of the sleeve 1202 in FIG. 12 may be similar as FIG. 11 in that it slides and twists on the stick; however, now the sleeve is a solid ring 1202 without any split cut 1104. The solid locking sleeve 1202 of this embodiment is a bit stronger to forces trying to remove the ball 602 from the groove 702 during play.

Similar locking sleeves may utilized with different toy attachments on the end of the stick 102. For example, a hook design 1206 with side cord channels is illustrated in FIG. 12 in contrast to the end channel 804 illustrated in FIG. 11. The sleeve lock 1102 operates in a similar manner to prevent the rope 1208 from exiting the hook 1206.

Figure 13:
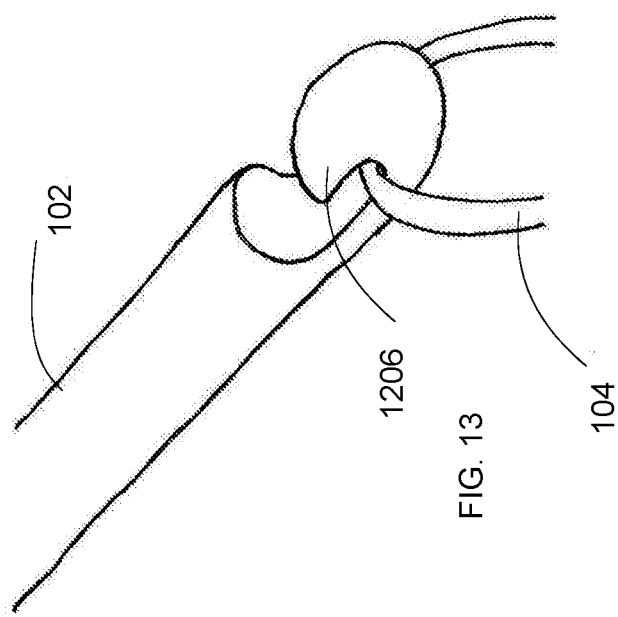
FIG. 13 illustrates a perspective view of a toy attachment comprising a hook notch near the stick end for attaching to looped toys according to an exemplary embodiment.

FIG. 13 illustrates a perspective view of a toy attachment comprising a hook notch 1206 near the stick end for attaching to looped toys 600 according to an exemplary embodiment. Similar to the above examples, a sleeve 1102 or other locking system may also be included with this design to prevent the toy 104 from being separated from the stick 102. The sleeve 1102 of FIG. 12 may be removable from the stick 1206 to simply use the hook notch 1206 of FIG. 13 in games where it is desirable for the dog to be able to remove the toy 104.

FIG. 14 illustrates a side view of a toy attachment comprising a threaded locking sleeve 1402 in the open position according to an exemplary embodiment. Like the examples shown in FIG. 11 and FIG. 12, the sleeve lock 1402 of FIG. 14 holds an attachment such as a rubber ball 602 of the toy 104 within a catch 802 or other grove on the stick 102. However, in this embodiment the stick 102 and the sleeve lock 1402 are threaded such that the user can rotate the sleeve lock 1402 in order to change the position of the sleeve lock 1402 from the open position where the ball 602 can be inserted and removed from the catch 802, and a closed position where the ball 602 is secured within the catch 802. Threaded sleeves 1402 may be beneficial to further increase security of the sleeve 1402 and prevent accidental opening during play.

FIG. 15 illustrates a side view of a toy attachment comprising a hook-shaped stick end 1502 with a threaded sleeve lock 1402 securing a toy 104 on the hook 1502 according to an exemplary embodiment. The hook-shaped end 1502 of the stick 102 in this embodiment achieves a similar purpose securing a toy 104 and is particularly suited to securing toys 104 that are looped or that need to be secured in the middle. The toy 104 is looped on the hook-shaped stick end 1502 and the sleeve lock 1402 is rotated by the user in order to prevent the toy 104 from being removed from the hook 1502. Rather than a threaded stick and sleeve lock 1402, another embodiment of FIG. 15 has a split-ring friction-fit sleeve lock 1102 similar to as shown in FIG. 11.

FIG. 16 illustrates a perspective view of a toy attachment comprising a threaded end cap 1602 for attachment to a threaded end 1604 of the stick 102 according to an exemplary embodiment. The end cap 1602 includes a cord channel 804 allowing for rubber ball 602 insertion and toy cord 806 to exit from front of cap according to an exemplary embodiment. FIG. 17 illustrates a side view of the end cap 1602 of FIG. 16, and FIG. 18 illustrates an end view of the end cap 1602 of FIG. 16. To secure a toy 104 to the elongated stick 102, the rubber ball 602 of the toy 104 or another section of the toy 104 that is larger than the cord channel 804 is inserted into the end cap 1602. The cord 806 extending from the rubber ball 602 or other toy section is fed through the cord channel 804 so that the cord 806 extends from the end of the end cap 1602. The end cap 1602 is then screwed onto the end of the elongated stick 102.

Figure 19:
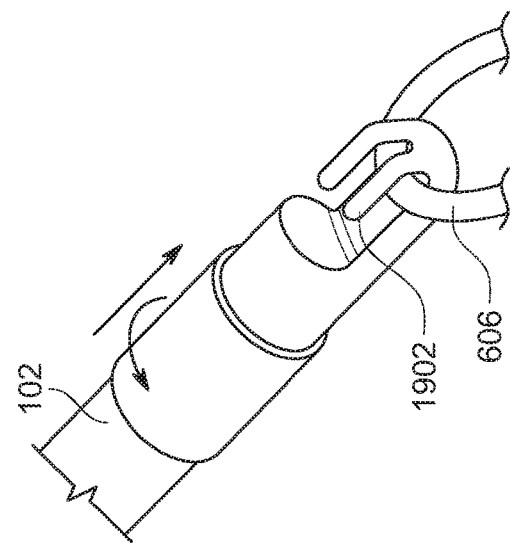
FIG. 19 illustrates a perspective view of a toy attachment comprising a claw-shaped catch that includes both side channels and a front channel allowing attachment of toys that have either or both of side cords and/or end cords according to an exemplary embodiment.

FIG. 19 illustrates a perspective view of a toy attachment comprising a claw-shaped catch 1902 that includes both side channels 1904 and a front channel 1906 allowing attachment of toys 104 that have either or both of side cords and/or end cords according to an exemplary embodiment. In this example, the claw-shaped catch 1902 holds a toy 104 with two side cords. The toy 104 includes a rubber ball 602 held within the claw-shaped catch 1902 and cords coming off either side of the toy 104 exit from the side channels 1904.

Figure 20:
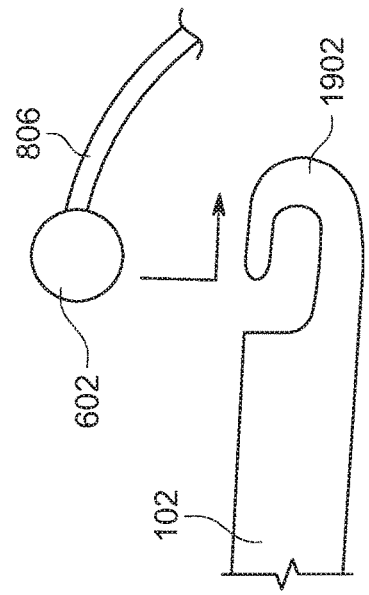
FIG. 20 illustrates a perspective view of the claw-shaped catch of FIG. 19 while holding a toy by a corded loop on the toy.

FIG. 20 illustrates a perspective view of the claw-shaped catch 1902 of FIG. 19 while holding a toy 104 by a corded loop 606 on the toy.

Figure 21:
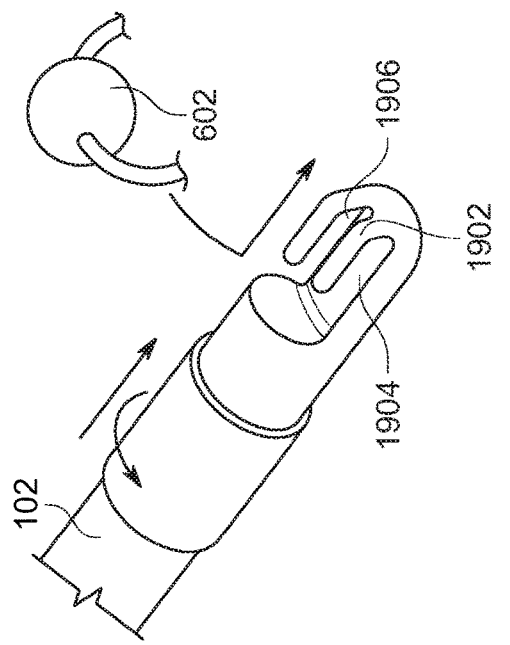
FIG. 21 illustrates a perspective view of the claw-shaped catch of FIG. 19 while holding a toy with an end cord.

FIG. 21 illustrates a perspective view of the claw-shaped catch 1902 of FIG. 19 while holding a toy 104 with an end cord 806. Similar to FIG. 19, the toy 104 includes a rubber ball 602 that is secured within the catch 1902; however, a single cord 806 attached to the rubber ball 602 extends through the center cord channel 1906 of the claw-shaped catch 1902.

Figure 22:
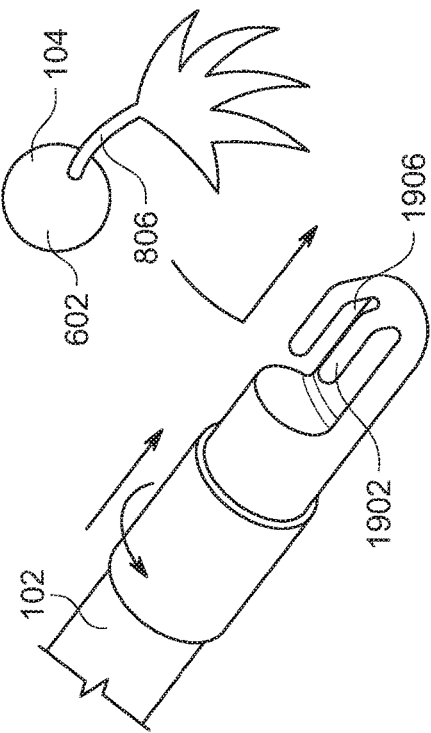
FIG. 22 illustrates a side view of the claw-shaped catch of FIG. 19 prior to insertion of the toy with the end cord of FIG. 21.

FIG. 22 illustrates a side view of the claw-shaped catch 1902 of FIG. 19 prior to insertion of the toy 104 with the end cord 806 of FIG. 21.

The claw-shaped catch 1902 is beneficial to support holding toys with an attachment section like a rubber ball 602 in the middle of the toy (e.g., FIG. 19), toys 104 that just use cords 806 and loops 606 without a rubber ball 602 (e.g., FIG. 20), and toys 104 with an attachment section like a rubber ball 602 at end of the toy (e.g., tail toy designs of FIG. 21 and FIG. 22).

Figure 23:
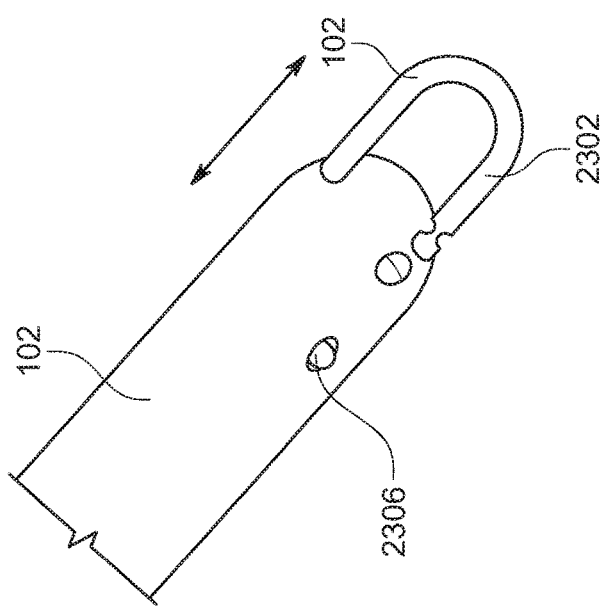
FIG. 23 illustrates a perspective view of a toy attachment comprising a padlock design for attaching toys to the end of the stick according to exemplary embodiment.

FIG. 23 illustrates a perspective view of a toy attachment comprising a padlock design 2302 for attaching toys 104 to the end of the stick 102 according to exemplary embodiment. The padlock design 2302 is similar to a padlock in that a U-shaped section 2304 of material such as rubber coated metal or durable plastic is provided. The U-shaped section 2304 of material can be opened by the user disengaging a locking mechanism 2306 such as by pressing a button on the side of the stick 102. When disengaged, the U-shaped section 2304 of material can be extended away from the end of the stick 106 and swiveled to open similar to a padlock. The user may then secure a toy 104 within the U-shaped section 2304 and return the U-shaped section 2304 to the locked position. The locking mechanism may include a spring such that, once locked, the U-shaped section 2304 stays in the locked position until being unlocked by the user.

Figure 24:
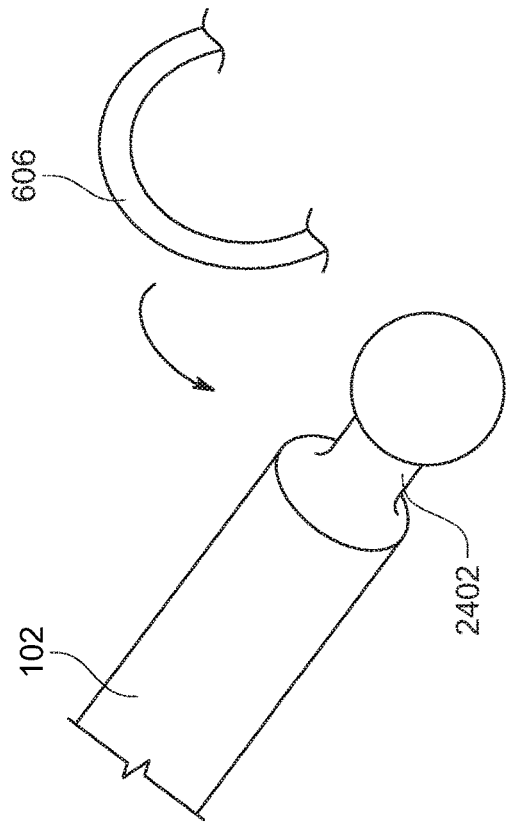
FIG. 24 illustrates a perspective view of a toy attachment comprising a notch around the perimeter of the stick end for attaching looped toys according to exemplary embodiment.

FIG. 24 illustrates a perspective view of a toy attachment comprising a notch around the perimeter 2402 of the stick end 106 for attaching looped toys 600 according to exemplary embodiment. Depending on user preferences, the cord loop 606 on the toy 104 can be twisted to help facilitate the cord remaining captured within the notch 2402. Alternatively, the notch design 2402 of this embodiment also facilitates removal of the toy 104 during play. The user has a great deal of control by the angle of the stick 102 of whether the dog will be able to remove the toy 104 from the stick 102. In some embodiments, the notch 2402 is significantly wider than the cord 606 of the toy 104. However, in other embodiments, the toy 104 attachment has a narrow notch around the perimeter 2402 of the stick end 106. The narrow notch 2402 may be substantially the same width as the toy cord 606. This similar width increases the friction forces and tends to keep the toy secured to the end of the stick. Removal is still possible, however, and the user remains in control by changing the angle of the stick 102 during play in order to either allow or prevent the dog from removing the toy 104.

Figure 25:
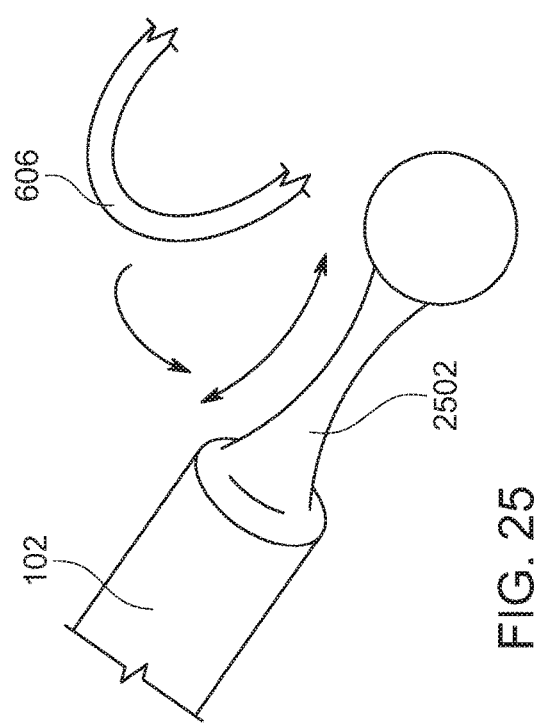
FIG. 25 illustrates a perspective view of a toy attachment comprising a rounded wide notch around the perimeter of the stock end according to an exemplary embodiment.

FIG. 25 illustrates a perspective view of a toy attachment comprising a rounded wide notch around the perimeter 2502 of the stick end 106 according to an exemplary embodiment. This design is similar to the notch 2402 of FIG. 24, except instead of more square corners on the notch like in FIG. 24, the notch 2502 of FIG. 25 is rounded in a gradual concave shape. Like the notch 2402 of FIG. 24, the concave shape of the rounded wide notch of FIG. 25 allows for movement of the toy cord 606 within the notch 2502 and allows the user to control whether the toy 104 is removed by the dog during play.

Figure 26:
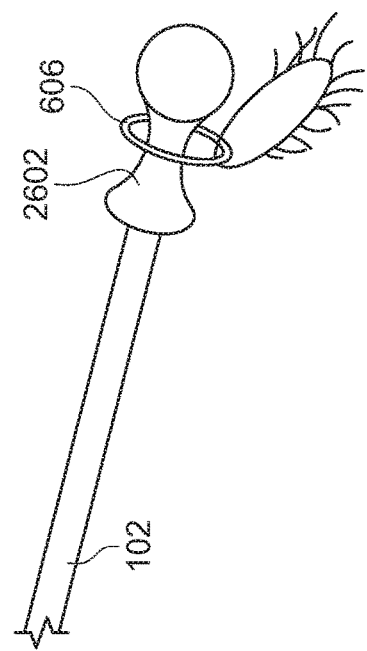
FIG. 26 illustrates a perspective view of a toy attachment comprising protrusions forming a concave attachment area according to an exemplary embodiment.

FIG. 26 illustrates a perspective view of a toy attachment comprising protrusions forming a concave attachment area 2602 according to an exemplary embodiment. Unlike the design of FIG. 25 where the concave shape is formed by a notched-out area, the rounded concave attachment area 2602 of FIG. 26 is formed by protrusions that have a diameter greater than the elongated stick 102. The protrusions together form a rounded concave area 2602 between them and this concave area can be utilized to secure a toy cord 606 similar to as described above for FIG. 25. As illustrated in FIG. 26, the toy cord loop 606 may also small enough to remain attached within the concave sections 2602 during play according to an exemplary embodiment. There may be a plastic spring toggle device on the toy cord allowing the cord loop 606 length to be adjusted. The user may tighten the loop 606 to make sure the toy 104 remains attached within the attachment area or may loosen the cord loop 606 to allow the toy 104 to be removed from the attachment area during play.

Figure 27:
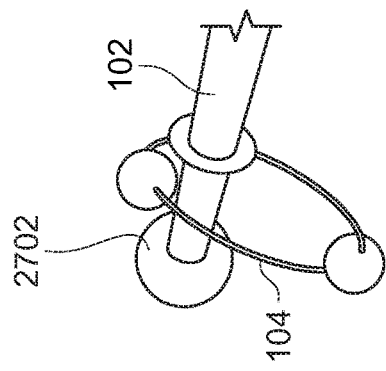
FIG. 27 illustrates a perspective view of a toy attachment comprising a plurality of raised ridges around the circumference of the stick according to exemplary embodiment.

FIG. 27 illustrates a perspective view of a toy attachment comprising a plurality of raised ridges 2702 around the circumference of the stick 102 according to exemplary embodiment. The raised ridges 2702 form an attachment area that may be utilized to secure a looped toy 600 during play.

Figure 28:
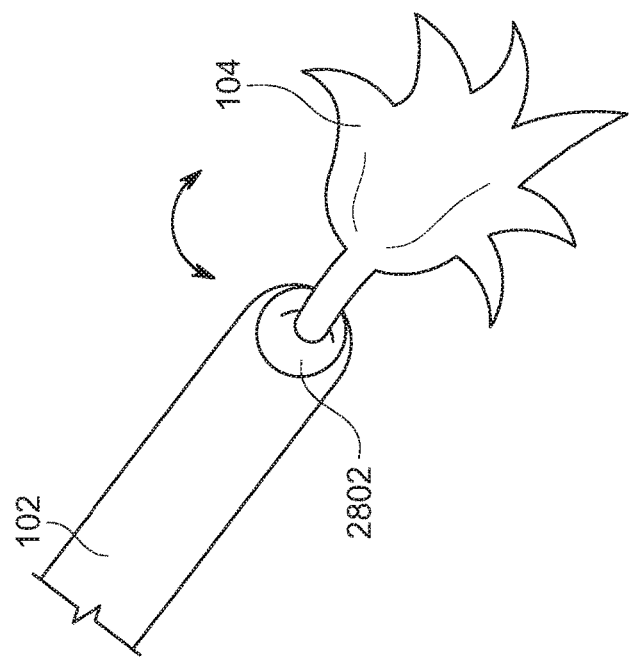
FIG. 28 illustrates a perspective view of a toy attachment comprising a first rotating union allowing toy rotation around a single axis during play according to an exemplary embodiment.

FIG. 28 illustrates a perspective view of a toy attachment comprising a first rotating union 2802 allowing toy rotation around a single axis during play according to an exemplary embodiment. In this embodiment, the rotating union 2802 is free spinning and has a single cord toy attached thereto.

FIG. 29 illustrates a perspective view of a toy attachment comprising a second rotating union 2902 allowing toy rotation around a plurality of different axis during play according to an exemplary embodiment. The second rotation union 2902 may be ball bearing swivel kit similar in design to those utilized on a nunchaku in martial arts.

When utilizing a rotating union 2902, the toy attachment may further include any of the toy attachments described herein positioned at the stick end 106 with the rotating union 2902 positioned between the elongated stick 102 and the toy attachment. In this way, each of the various toy attachments such as hooks 1206, notches 702, pad locks 2302, straps 404, loops, etc. may be rotatable during play.

FIG. 30 illustrates a perspective view of a toy attachment comprising an integrated strap loop 3002 on the stick end 106 for toy attachment according to an exemplary embodiment. Unlike the straps 404 illustrated in FIG. 4, the strap 3002 in FIG. 30 is permanently closed and forms a fixed loop 3004. The integrated strap loop 3002 may be utilized similar to the eyelet 302 of FIG. 3, except the strap loop 3002 of this embodiment may be safer for and withstand incidental bites during play.

FIG. 31 illustrates a perspective view of a toy attachment comprising a strap loop cap 3102 on the stick end 106 for toy attachment according to an exemplary embodiment. The cap 3102 may be similar to as illustrated in FIG. 16 in that it screws on to a threaded end of the stick 1604. Two holes 3104 in the cap 3104 allow the strap loop 3002 to extend from the cap 3102.

FIG. 32 illustrates a cross section view of toy attachment comprising a notched-out hook section 3202 on the stick end 106 for attaching a looped toy 600 with a rubber friction surface 3204 according to exemplary embodiment. Further, also illustrated in FIG. 32 is a protrusion 3202 coming off a side of the stick 102 for attaching a looped toy 600 according to an exemplary embodiment. The embodiment of FIG. 32 is an example of how multiple toy attachments disclosed herein may be incorporated and merged into a single toy attachment having different ways of securing toys and being compatible with a wider variety of toys 104. For instance, a single toy attachment may include multiple of hooks 1206, notches 2402, pad locks 2302, straps 404, loops 3002, etc.

FIG. 33 illustrates a perspective view of a looped toy 600 with rubber ball attachment 602 according to an exemplary embodiment. In addition to the rubber ball 602 in the middle of cord forming a loop 606, the toy 600 further includes a spring-loaded cord stopper 3304 allowing the cord loop 606 size to be adjusted by the user.

FIG. 34 illustrates a side view of a toy attachment comprising a concave stick end 3402 for attaching the looped toy 600 with rubber ball 602 of FIG. 33 while still allowing some movement of ball within the concave section 3402 during play according to an exemplary embodiment. In use, the user may first loop the toy cord 606 around the concave section 3402 and then tighten the cord stopper 3304 in order to resize the loop of the toy to a small enough circumference that the toy 600 cannot be removed from the concave section. Play with the dog then allows the toy loop 606 and rubber ball 602 to slide around in the concave section 3402 without falling off or being removable by the dog under normal force amounts.

FIG. 35 illustrates a side view of a toy attachment comprising a plurality of concave sections 3602 along the stick side for gripping the looped toy 600 with rubber ball 602 of FIG. 33 while still allowing the ball 602 to move between concave sections 3602 during play according to an exemplary embodiment. The concave sections 3602 in this example match the curvature of the rubber ball 602 and given enough force by the dog during play, the rubber ball can hop from a first concave section to a second concave section.

FIG. 36 illustrates a side view of a toy attachment comprising a plurality of concave sections 3502 along the stick side for providing a rumble effect against the rubber ball 602 of FIG. 33 while the ball moves across the concave sections 3502 during play according to an exemplary embodiment. The concave sections 3502 in this example are smaller than the curvature of the rubber ball 602. In this way, the rubber ball 602 experiences less friction when transferring between concave sections 3502 and rapid transfer of the rubber ball 602 may occur between many sections upon a single pull by the dog during play.

FIG. 37 illustrates a side view of a toy attachment comprising a plurality of concave sections 3502 around the circumference of the stick 102 for providing either the gripping or rumble effects as described for FIG. 35 and FIG. 36 depending on curvature of the concave sections 3502 according to an exemplary embodiment. In the embodiment of FIG. 37, the entire circumference of the stick end 106 includes the concave sections 3502 and therefore the rubber ball 602 may rotate around the stick 102 in addition to moving between concave sections 3502 during play.

FIG. 38 illustrates a cross section view of a toy attachment comprising a hollowed-out section 3802 within the stick end 106 allowing a rubber ball 602 within the stick section to move within the hollowed-out section 3802 during play according to an exemplary embodiment. In some embodiments, the rubber ball 602 may be inserted during manufacture and may not be removable by the user. Alternatively, the rubber ball 606 may of a compressible rubber in order to be squished into the hole at the top of the stick 3804 in order to enter the hollowed-out section 3802. The hole 3804 may also be positioned at other locations on the stick 102 such as on the stick end 106 directly at the front in other embodiments. Likewise, multiple holes may be included in order to allow multiple toy tails and/or cords to exit from the hollowed-out section 3802 in different directions.

FIG. 39 is a perspective view of a toy attachment comprising a plurality of concave sections 3502 along a stick side for attaching a looped toy 600 with rubber ball 602 according to an exemplary embodiment. The embodiment is of FIG. 39 is somewhat similar to that of FIG. 35 and may also be utilized in a similar manner. However, the concave sections 3502 in the embodiment of FIG. 39 are much deeper and more bowl shaped. As a result, each of the concave sections 3502 in this embodiment are also capable of gripping a toy 3304 with a rubber ball 602 and holding it in position even without the use of a cord loop 606 on the toy 3304. In this manner, the toy attachment of FIG. 39 can in fact simultaneously hold a plurality of toys with rubber balls 602.

FIG. 40 illustrates a side view of a toy attachment comprising a smooth concave section 4002 on a single side of the stick end 4004 for attaching to a looped toy 3304 such as the toy with rubber ball 602 attachment of FIG. 33 according to an exemplary embodiment. Unlike the smooth concave section 3402 of FIG. 34, the smooth concave section 4002 in FIG. 40 is only provided on a single side of the stick 4004.

FIG. 41 illustrates a side view of a toy attachment comprising a ridged concave section 4102 on a single side of the stick end 4004 for attaching to a looped toy 3004 such as the toy with rubber ball 602 attachment of FIG. 33 according to an exemplary embodiment. The ridges along the concave section again provide some additional friction and rumble effect as the rubber ball 602 is moved across the ridges.

Figure 43:
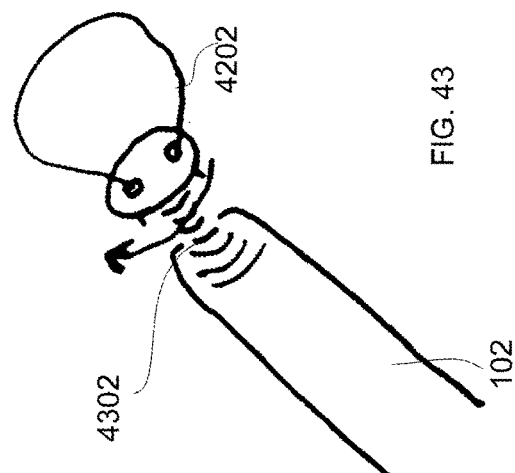
FIG. 43 illustrates a perspective view of a toy attachment comprising a rope loop attached to a flexible and rotatable spring on the stick end according to an exemplary embodiment.
Figure 42:
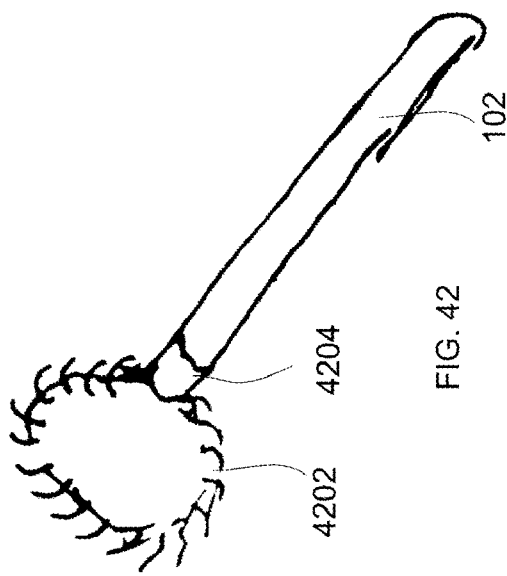
FIG. 42 illustrates a perspective view of a toy attachment comprising a rope loop attached to a rotating union on the stick end according to an exemplary embodiment.

FIG. 42 illustrates a perspective view of a toy attachment comprising a rope loop 4202 attached to a rotating union 4204 on the stick end 106 according to an exemplary embodiment. FIG. 43 illustrates a perspective view of a toy attachment comprising a rope loop 4202 attached to a flexible and rotatable spring 4302 on the stick end 106 according to an exemplary embodiment. Any type of toy attachment disclosed herein may be made rotatable in a similar manner.

Figure 45:
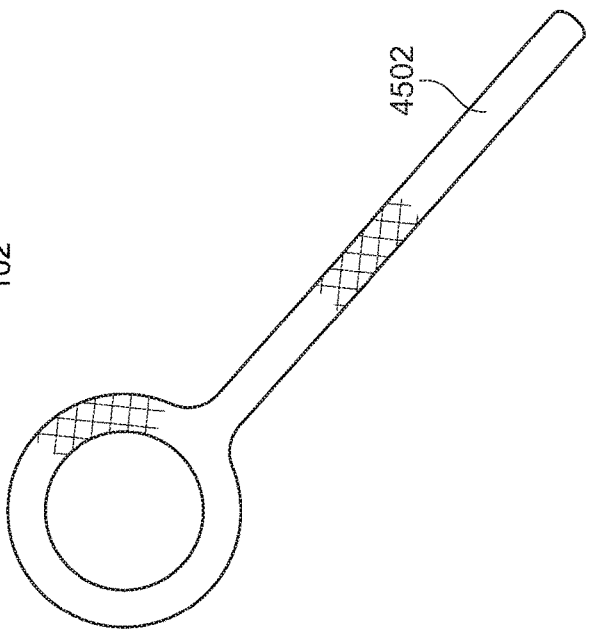
FIG. 45 illustrates a perspective view of a second fully chewable stick attachment according to an exemplary embodiment.
Figure 44:
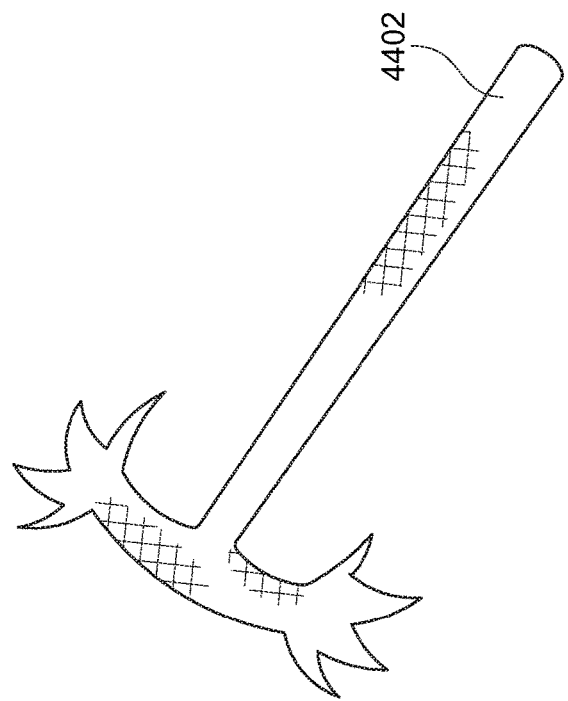
FIG. 44 illustrates a perspective view of a first fully chewable stick attachment according to an exemplary embodiment.

FIG. 44 illustrates a perspective view of a first fully chewable stick attachment 4402 according to an exemplary embodiment. The first fully chewable stick attachment 4402 may be attached to the stick end 106 using any suitable toy attachment described here. Likewise, the stick attachment 4402 may also be attached in other manners such as a bolt on the stick end 106 that mates with a threaded hole on the end of the chewable stick attachment. A benefit of having a fully chewable stick attachment on the end of the elongated stick is that, after cooperative play is finished between the owner and the dog, the owner may detach the chewable stick attachment 4402 and give it to the dog as a reward. The dog may be tired out and fall asleep while chewing on the stick attachment 4402. Any shapes and designs of chewable stick attachments 4402 are possible. For instance, FIG. 45 illustrates a perspective view of a second fully chewable stick attachment 4502 according to an exemplary embodiment. In addition to being user-removable attachments, the chewable stick attachments 4402, 4502 of FIG. 44-45 may also be permanently attached to the stick 102 at during manufacturing.

Figure 46:
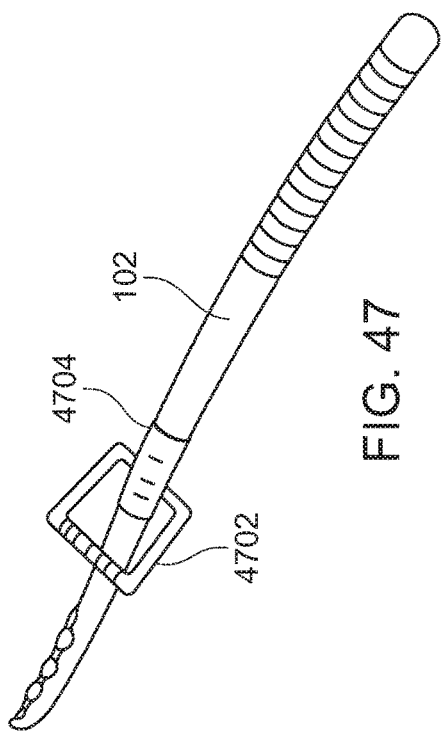
FIG. 46 illustrates a perspective view of a handle integrated on the stick side according to an exemplary embodiment.

FIG. 46 illustrates a perspective view of a handle 4602 integrated on the stick side according to an exemplary embodiment. The handle 4602 helps the user provide a point of rotation near the middle of the stick 102 in order to provide leverage and speed of toy movement during play. The handle may also be more ergonomically comfortable to the user and avoid repetitive stress of the user's wrist if they continually hold the middle of the stick with one hand during play. In some embodiments, the handle position is fixed near the center of the elongated stick 102.

Figure 47:
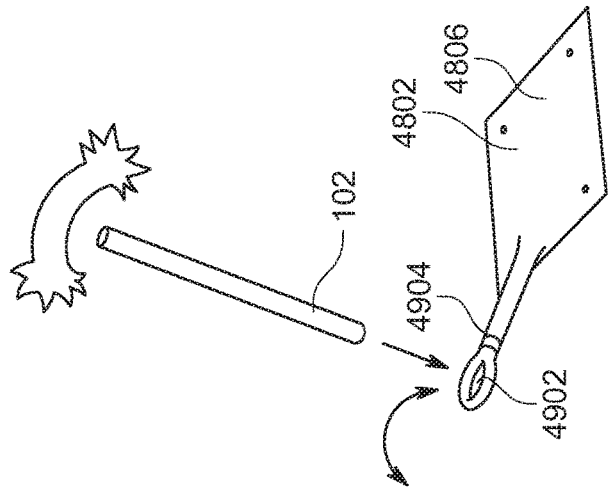
FIG. 47 illustrates a perspective view of a movable handle on the stick side according to an exemplary embodiment.

FIG. 47 illustrates a perspective view of a movable handle 4702 on the stick side according to an exemplary embodiment. The handle 4702 includes a sleeve 4704 at the base of the handle 4702 through which the stick passes. The handle 4702 may thereby slide up and down the stick 102 and rotate around the stick 102 during play. The user is thereby provided a greater ability to quickly snap the toy 104 from position to position. This is similar to as if the user let the stick slide through their hand; however, frictional rubbing on the hand is prevented because it is the sleeve of the handle 4704 that slides against the stick. Any shape and design of the handle may be employed. In some embodiments, the handles 4702 may simply be plastic tubular sleeves that have a rubber grip coating on an outer facing side for the user to hold and a smooth plastic side facing the stick for minimal frictional forces.

Figure 48:
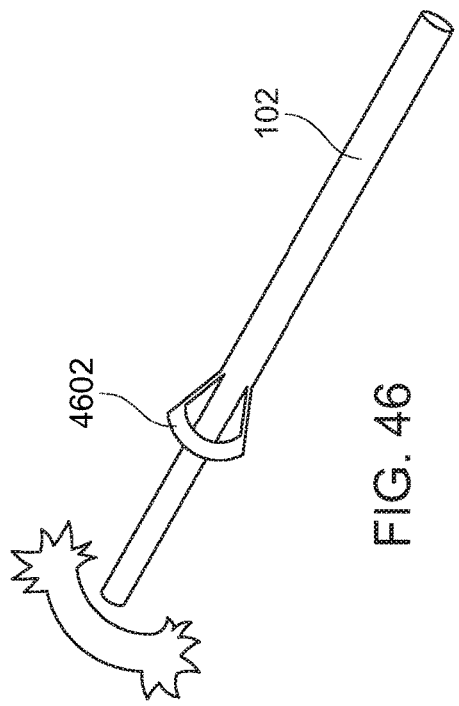
FIG. 48 illustrates a perspective view of a flat mount stick attachment with tubular socket according to an exemplary embodiment.

FIG. 48 illustrates a perspective view of a flat mount stick attachment 4802 with tubular socket 4804 according to an exemplary embodiment. The flat mount stick attachment 4802 includes a base plate 4806 with a socket 4804 configured to accept the end of the elongated stick 102 opposite the end 110 where the toy 104 is attached. The base plate 4806 includes a number of screw holes 4808 to permanently mount the base plate 4806 to a surface such as a wooden floor or wall. Alternatively, the base plate 4806 may be held in place under a piece of furniture, other heavy object, or even a foot of the user. The socket 4804 in this configuration is a cylindrical sleeve that is affixed to the base plate 4806 at approximately a forty-five-degree angle. In use, the end of the elongated stick 102 opposite the end where the toy 104 is attached is inserted into the cylindrical sleeve, and the stick 102 is held at a forty-five-degree angle with respect to the base plate 4806. The user may then let go of the stick 102 and the stick 102 will remain in place. The flat mount stick attachment 4802 is beneficial both for solo play by the dog and cooperative play between owner and dog. Especially when utilized with a flexible stick such as illustrated in FIG. 2, the dog may jump up many times in order to try and retrieve a toy 104 suspended by the stick 102 held by the flat mount 4802. The dog may fight the spring in the stick and allow the owner to take a break while the dog continues to exercise.

Figure 49:
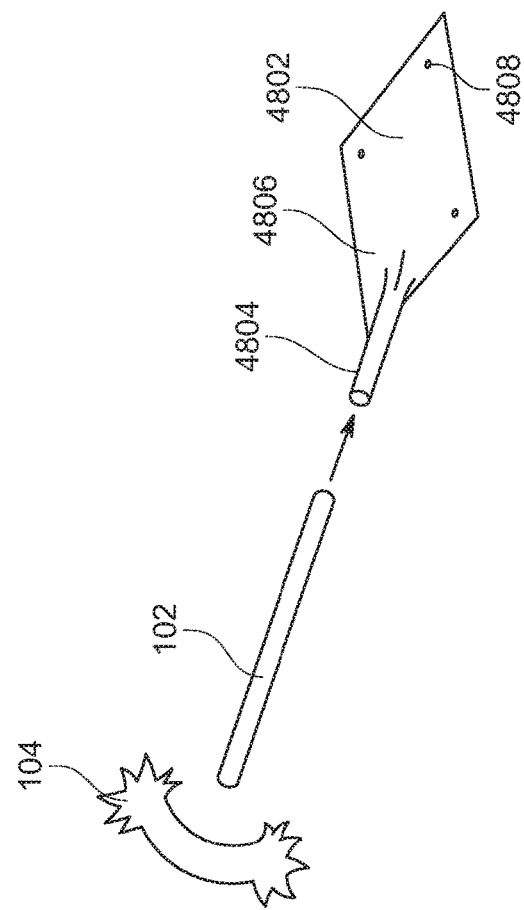
FIG. 49 illustrates a perspective view of a flat mount stick attachment with ring support according to an exemplary embodiment.

FIG. 49 illustrates a perspective view of a flat mount stick attachment 4802 with ring support according to an exemplary embodiment. This embodiment includes an eyelet ring 4902 affixed to the end of a supporting arm 4904 that is attached to the base plate 4806. The stick 102 can be inserted into the ring 4902 and may rotate around the ring 4902 during play.

Figure 50:
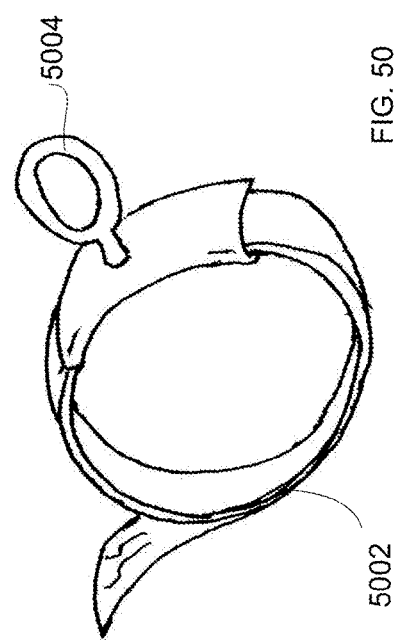
FIG. 50 illustrates a perspective view of a leg strap with supporting eye ring for facilitating one-handed play by the user according to an exemplary embodiment.

FIG. 50 illustrates a perspective view of a leg strap 5002 with supporting eye ring for facilitating one-handed play by the user according to an exemplary embodiment. The leg strap 5002 includes an eye ring 5004 and one or more straps that allow the user to wrap the leg strap 5002 around their upper leg. The straps may be hook and ring such as Velcro® or may have other desired attachments such as buttons, snaps, zippers, etc. Once secured to the user's leg, the user may pass the elongated stick 102 through the eye ring 5004 such that the ring 5004 provides a pivot point for the stick 102. With only one hand on the base of the stick 102, the user can quickly pivot and change the position of the stick 102 and as a result the toy 104. For example, the action during play may be similar to the user rowing the oar of a row boat. This may be done even when the user is sitting down such as while watching television. The leg strap 5004 can help the user to reduce energy output while still exercising the dog in a vigorous manner.

Figure 51:
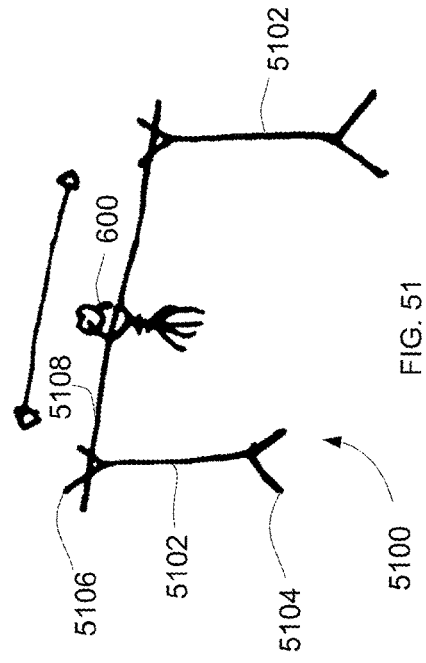
FIG. 51 illustrates a perspective view of a support rack for suspending the toy according to an exemplary embodiment.

FIG. 51 illustrates a perspective view of a support rack 5100 for suspending the toy 600 according to an exemplary embodiment. The rack 5100 includes a plurality of side supports 5102 with Y-shaped bases 5104 and tops 5106, and an elongated member 5108 suspended between the Y-shaped tops 5106. A toy 600 is suspended from the elongated member 5108 and hangs down. The support rack 5100 may also be utilized to exercise the dog while the owner takes a break. For instance, the owner may detach the toy 600 from the elongated stick 5108 and then pass the elongated stick 5108 through the cord loop 606 of the toy 600. The user then places the elongated stick 5108 between the Y-shaped tops 5106 of the support rack 5100. The dog may continue jumping under the toy 600 trying to retrieve the toy while the owner rests. The side supports 5102 may be telescoping such that the user can adjust the height to position the toy 600 just out of reach of the dog or just within reach of the dog depending on the desired game. In other embodiments, rather than the elongated member 5108 of the support rack 5100 being the elongated stick 5108, other elongated members be used. For instance, an elastic line, rope or cord may be suspended between the tops of the side supports.

Figure 52:
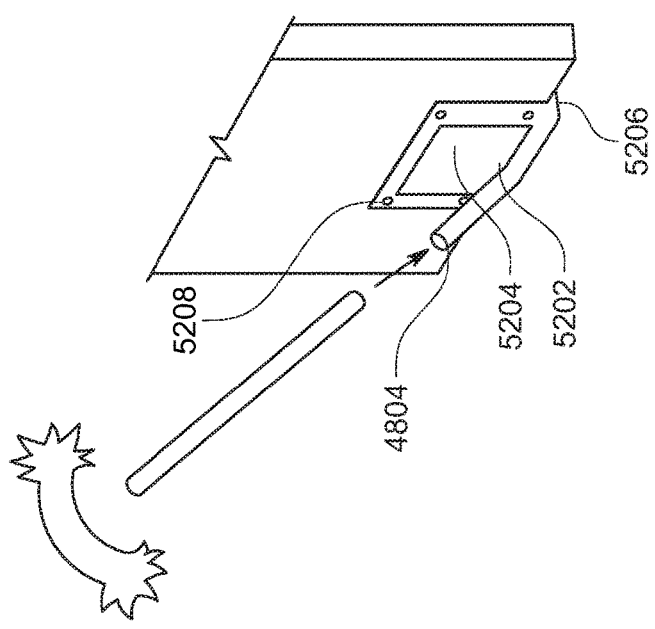
FIG. 52 illustrates a perspective view of a door mount stick attachment according to an exemplary embodiment.

FIG. 52 illustrates a perspective view of a door mount stick attachment 5202 according to an exemplary embodiment. The door mount stick attachment 5202 includes two side plates 5204 that are positioned on either side of a door and hold the door mount 5202 to the door. A base plate 5206 is connected to the side plates 5204 forming a U-shape and abuts against the base of the door. A socket 4804 again acts as a stick holder and is illustrated as a cylindrical sleeve mounted to at least one of the side plates 5204 and/or base plate 5206. The socket 4804 comes off at approximately forty-five-degree angle with respect to the base plate 5206. When mounted to the door, the door mount stick attachment 5202 may be utilized similarly to as described above for the flat mount stick attachment of 4802 FIG. 48 where the user can insert the stick into the socket 4804 in order to let the door mount hold the stick 102 instead of the user. The socket 4804 has a size for accepting the end of the rigid stick for acting as a holder of the rigid stick 102.

Figure 53:
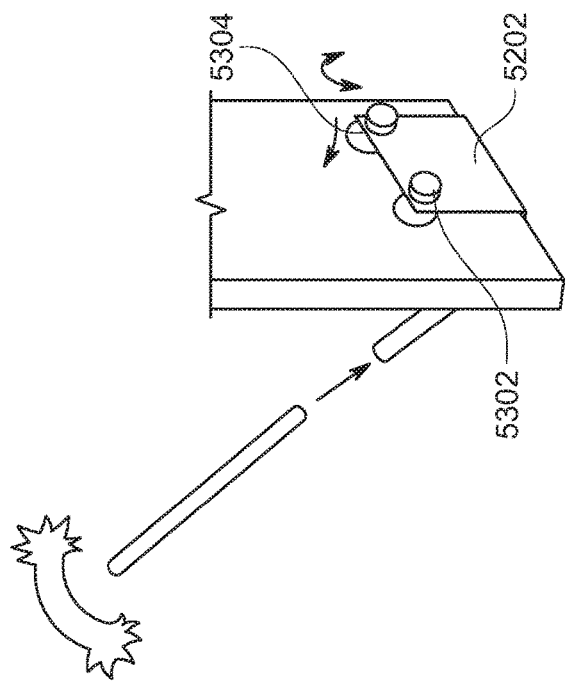
FIG. 53 illustrates a perspective view of a door mount stick attachment with tightening bolts according to an exemplary embodiment.

FIG. 53 illustrates a perspective view of a door mount stick attachment 5202 with tightening bolts 5302 for securing the door mount 5202 to the door without damaging or altering the door according to an exemplary embodiment. Although the side 5204 and/or base plates 5206 of the door mount 5202 may include screw holes 5208, often users will not want to drill holes into the door. To allow for temporary and non-damaging installation, the screw holes 5208 of FIG. 52 may instead be used to hold tightening bolts 5302 as shown in FIG. 53. A tightening bolt 5302 is inserted through the screw hole 5208 on the side plate 5204 and a thread of the bolt catches on the screw hole sides of the same diameter, or the screw holes may themselves be threaded to be compatible with the tightening bolt. The end of the bolt may be a handle for the user and when turned by the user the tightening bolt presses a rubber stopper 5304 against the side of the door. The rubber stopper 5304 acts as a friction pad to prevent the door mount 5202 from falling off the door.

FIG. 54 illustrates a side view of a door mount stick attachment 5202 having inwardly biased side plates 5402 according to an exemplary embodiment. When not attached to a door, the side plates 5204 are inwardly biased toward each other. The user must exert some force to push these side plates 5204 apart from each other in order to slide the door mount 5202 onto the door. After the user has slid the door mount 5202 onto the door and let go, the side plates 5204 naturally bend toward each other and grip against the door. The inner surfaces of the side plates may include friction pads and material and the inward bias of the side members may be sufficient to hold the door mount on the door.

FIG. 55 illustrates a side view of the door mount stick 5202 utilizing rubber stopper bolts 5502 while attached to the door. If additional support is needed to hold the door mount secure on the door during play, tightening bolts 5302 of FIG. 53 may be utilized. Tightening bolts 5302 may be included in a kit as a user-configurable component. For example, thin doors may need tightening bolts 5302 while thick doors may not.

FIG. 56 illustrates a perspective view of a seat mount stick attachment 5602 according to an exemplary embodiment. The seat mount stick attachment 5602 is similar to a combination of the floor mount 4802 of FIG. 48 and FIG. 49 and the leg strap 5002 of FIG. 50. The seat mount 5602 of FIG. 56 is intended to be sat on by the user. To this end, the base plate 5604 may be contoured and may include a cushion for additional user comfort. The seat mount includes a stick support extending from a side of the base plate at approximately a forty-five-degree angle. An eye ring 4902 is attached at the end of the stick support opposite the base plate 5604.

FIG. 57 illustrates a perspective view of the seat mount stick attachment 5602 of FIG. 56 while in use by a user during play according to an exemplary embodiment. As shown, the stick holder socket 4804 extends between the user's legs and the user has passed the stick 102 through the eye ring 4904. In this way, the user may pivot the stick 102 using only a single hand on the base of the stick while seated. Energy and physical exertion requirements on the user are therefore reduced in comparison to standing during play.

According to an exemplary embodiment, a dog toy assembly 100 includes an elongated stick 100 with a toy attachment on an end 106. A toy 104 is attached to the toy attachment. By holding and manipulating the stick during play, a user obtains leverage to accurately and quickly control the toy 104. The toy attachment may be removably attached to the stick, may be rotatable, and may include loops 4202, hooks 1206, concave sections 3402, and rings 4902. A locking sleeve 1102 may be included to keep the toy 104 attached. The stick may include a handle 4602 and may be flexible. A leg strap 5002 including an eyelet 5004 through which the stick 102 passes may be worn by the user to provide a pivot point and allow one-handed play while seated. Door mounts 5202, floor mounts 4802, seat mounts 5602, and support racks 5100 include stick holders to give the user a break while the dog continues to play. The toy attachment and toy itself may be fully chewable and removable.

The elongated stick 102 itself may also be made of chewable material in some embodiments. Likewise, the entire dog toy assembly including the toy 104, handles 4602, locking sleeve 1102, the toy attachment, the stick 102, and the stick mounting hardware may all be made of chewable and/or bite-safe materials. The elongated stick 102 may come in different sizes to accommodate different user preferences. The stick 102 may also be adjustable in length such as telescoping or have a plurality of sections allowing the user to increase or decrease the length as required. In some embodiments, the stick adaptable to be adjusted in length from two feet long to five feet long. In other embodiments, the stick is up to four feet long.

Exemplary benefits of some embodiments of the invention include challenging the dog with interactive indoor play that does not require exhausting effort by the owner. Owners may use indoor spaces such as apartments without backyards to exercise their dog. Likewise, the devices and method disclosed herein may also be utilized to facilitate indoor exercise when outdoor weather conditions are poor. Of course, embodiments disclosed herein may also be utilized in an outdoor setting and are not limited only to indoor use.

Depending on owner preferences, dog toys 100 disclosed herein may also be utilized in a manner that exercises both the owner and the dog at the same time in a new an interesting way. Various toy attachments disclosed herein beneficially allow different toys to be attached to the stick thereby increasing the variety of play options and games. Toy attachments can be beneficially configured to rotate and/or allow the toy 104 to be removed from the stick 102 or held fast to the stick 102 during play. Toy attachments and associated toys may be sold together with the elongated stick 102. Toy attachments may also be integrated onto stick sections to be changed allowing different toys to be utilized at different times.

Custom toys disclosed herein beneficially include rubber balls 602 and cord tightening mechanisms 3304 allowing easy attachment to the end of the elongated stick 102. Different toy attachments disclosed herein beneficially enable toys with looped cords 606 as well as toys that do not have looped cords 606 to be attached to the end of the stick 106. Having a toy attachment that allows for de-attachment and re-attachment of toys also advantageously facilitates attaching replacement toys when previous toys are destroyed or wear out from extensive play.

Stick mounts disclosed herein beneficially allow challenging play even while the owner is seated. Owners in wheelchairs, seniors, injured persons, people with back problems, and children, may beneficially exercise the dog in a vigorous manner with minimal effort on the part of the human according to exemplary embodiments.

Safety levels may be beneficially increased when play is performed utilizing dog toys disclosed herein because the elongated stick 102 keeps human hands and fingers clear of the dog's mouth. Safety of training and exercising unfamiliar dogs or aggressive dogs may be increased, which is of particular benefit for kennels and dog boarding facilities where the dogs in care may be nervous but still require ongoing, regular exercise in confined spaces.

Cleanliness may also be increased by the use of the dog toys and method disclosed here because wet toys covered in dog slobber are kept away from the user's hands by the use of the elongated stick 102. The owner can interact and play with their dog utilizing a toy 104, but the owner does not need to directly touch the toy with their hands. Dog teeth hygiene may also be enhanced in some embodiments. Frequently playing with ropes and toys may beneficially help floss and generally clean the dog's teeth.

In an exemplary embodiment, a dog toy 104 is formed by a rope on a stick 102 for an owner to control. The stick 102 extends the reach of the owner to allow the owner to move the target rope with leverage, an increase in speed, stronger pulling capabilities, and the ability to move the rope or toy 104 attached thereto in a challenging way that is fun for the dog. Because of the leverage, the dog toy 100 requires a fraction of the owner's energy to tire the dog out. The dog toy 100 can be built with many different materials, depending on supply and demand. The stick 102 can range from two to four feet in some embodiments and can have different colors of rope and themes. In an exemplary embodiment, a dog toy 100 is formed by rope on a bendable rod or stick. The rod is bendable under tension and allows for a different type of movement and feel for the dog. Again, the rod 102 may be between two and four feet and can bend like a sturdy fishing rod. Because the pressure is absorbed over the length of the bending rod, it can also be mountable and the bending can minimize pressure on a concentrated point on the mount. The mount may be a flat plate with an entry for the handle of the stick/rod. The mount can be secured by weight of the owner, or by a piece of furniture. It can be mounted outdoors to a deck, or the side of a fence. A second mount can be designed to clamp to a door in the home so it can be moved easily. The mounts also help allow for challenging solo play, indoors and outdoors.

Although the invention has been described in connection with preferred embodiments, it should be understood that various modifications, additions and alterations may be made to the invention by one skilled in the art without departing from the spirit and scope of the invention. For example, functions of single units may be separated into multiple elements, or the functions of multiple features may be combined into a single unit. Although the above examples have primarily focused on dog owners who need to exercise their own dogs, the dog toys 104 and stick attachments and even stick mounts disclosed herein may also be beneficially utilized by dog trainers to determine and test aggression levels with unfamiliar dogs. Likewise, although the above examples have focused on dogs, the disclosed devices and play techniques may also be utilized with other types of pets such as cats and rodents. The toy attachments may be separate units that are screwed onto the end of a standard threaded stick 1604, or using any suitable type of attachment mechanism, or may be permanently or temporarily integrated onto the stick end 106 during manufacture. Likewise, although there are significant benefits as disclosed herein to having a toy attachment on the stick end 106 that allows attaching and detaching toys as desired, in another embodiment, the toy 104 may be permanently attached to the stick end 106 using any desired permanent attachment mechanism.

Locking systems like the sleeve 1102 design may be utilized in any of the above designs illustrated without a locking system, and, likewise, the locking system maybe omitted in any of the above designs illustrated with a locking system. Rotatable ends may also be interchangeably utilized in any of the above embodiments that is not illustrated with a rotatable end. The locking sleeve may be spring loaded in other embodiments in order to lock over the toy attachment when released by the user and manually moved by the user against the spring force in order to open the sleeve and allow toy removal from the toy attachment. The stick mounts such as the door mount 5202 may also be beneficially utilized in other embodiments to hold other types of devices such as treat dispensers.

All combinations and permutations of the above described features and embodiments may be utilized in conjunction with the invention.

What is claimed is:

1. An assembly for exercising an animal, the assembly comprising:
    a rigid stick;
    a sleeve lock through which the rigid stick passes; and
    an attachment for securing a toy to the rigid stick;
    wherein the toy acts as a lure for the animal, and the attachment directly secures the toy to the rigid stick such that each linear movement of the rigid stick results in a corresponding linear movement of the toy;
    the sleeve lock is movable along a portion of the rigid stick such that in a first position the sleeve lock covers the attachment thereby securing the toy within the attachment, and in a second position the sleeve lock does not cover the attachment thereby allowing the toy to be removed from the attachment;
    the sleeve lock and the rigid stick are threaded and rotatable relative one another;
    when the sleeve lock is rotated in a first direction the sleeve lock moves away from the attachment thereby freeing the toy from the attachment; and
    when the sleeve lock is rotated in a second direction the sleeve lock is moved toward the attachment thereby securing the toy within the attachment.

2. The assembly of claim 1, wherein the attachment allows a user to selectively secure and release the toy to and from the rigid stick.

3. The assembly of claim 1, wherein the attachment is located at an end of the rigid stick.

4. The assembly of claim 1, wherein the attachment includes an eye screw with an eye through which the toy passes.

5. The assembly of claim 1, further comprising a door mount comprising:
    side plates connected by a base plate together forming a U-shape; and
    a socket mounted to the U-shape;
    wherein the side plates are for being positioned on either side of a door while the base plate is for being positioned under a base of the door; and
    the socket has a size for accepting an end of the rigid stick for acting as a holder of the rigid stick.

6. The assembly of claim 1, further comprising a mount comprising:
    a base plate;
    a stick support extending from the base plate; and
    an eye ring attached to an end of the stick support;
    wherein the eye ring has a diameter greater than the rigid stick; and
    during usage, a user sits on the base plate and passes the rigid stick through the eye ring in order to utilize the eye ring to provide a pivot point along the rigid stick.

7. The assembly of claim 1, wherein the attachment includes at least one groove and the groove matches a shape of a first part of the toy and has a groove diameter slightly smaller than the first part of the toy thereby allowing the groove to securely hold the first part of the toy.

8. The assembly of claim 7, further comprising a cord channel extending from the groove to an end of the rigid stick for passing a cord from the first part of the toy to a second part of the toy.

9. The assembly of claim 1, further comprising a looped toy comprising:
   a ball having a through hole;
   a cord passing through the through hole; and
   a spring toggle device through which opposite ends of the cord pass thereby forming a loop of the cord upon which ball is held;
   wherein the spring toggle device secures the loop to the ball while allowing a circumference of the loop to be adjusted.

10. The assembly of claim 1, wherein the rigid stick is formed such that under lateral forces equal to a weight of the animal at a first end of the rigid stick while the rigid stick is held fixed in position at a second end opposite the first end deflects less than two percent of a length of the rigid stick.

11. The assembly of claim 1, wherein the attachment comprises a claw-shaped catch that includes a plurality of side channels and a front channel.

12. The assembly of claim 11, further comprising the toy including a rubber ball with a pair of side cords, respective ones of the pair of side cords extending from opposite sides of the rubber ball; wherein, the rubber ball is held within the claw-shaped catch and the respective ones of the pair of side cords extend off either side of the rubber ball passing through the side channels of the claw-shaped catch.

13. The assembly of claim 11, further comprising the toy including a rubber ball with an end cord; wherein, the rubber ball is held within the claw-shaped catch and the end cord extends off the rubber ball passing through the front channel of the claw-shaped catch.

14. The assembly of claim 1, further comprising a movable handle, the movable handle including a sleeve at a base of the movable handle through which the rigid stick passes, whereby the movable handle may thereby slide up and down the rigid stick and rotate around the rigid stick during play.

15. An assembly for exercising an animal, the assembly comprising:
   a rigid stick;
   a sleeve lock through which the rigid stick passes; and
   an attachment for securing a toy to the rigid stick;
   wherein the toy acts as a lure for the animal, and the attachment directly secures the toy to the rigid stick such that each linear movement of the rigid stick results in a corresponding linear movement of the toy;
   the sleeve lock is movable along a portion of the rigid stick such that in a first position the sleeve lock covers the attachment thereby securing the toy within the attachment, and in a second position the sleeve lock does not cover the attachment thereby allowing the toy to be removed from the attachment; and
   the sleeve lock is a split ring having a diameter slightly smaller than a diameter of the rigid stick such that the split ring grips the rigid stick and friction forces hold the split ring in position.

16. The assembly of claim 15, wherein the attachment includes at least one groove and the groove matches a shape of a first part of the toy and has a groove diameter slightly smaller than the first part of the toy thereby allowing the groove to securely hold the first part of the toy.

17. The assembly of claim 16, further comprising a cord channel extending from the groove to an end of the rigid stick for passing a cord from the first part of the toy to a second part of the toy.

18. The assembly of claim 15, wherein the attachment comprises a claw-shaped catch that includes a plurality of side channels and a front channel.

19. The assembly of claim 18, further comprising the toy including a rubber ball with a pair of side cords, respective ones of the pair of side cords extending from opposite sides of the rubber ball; wherein, the rubber ball is held within the claw-shaped catch and the respective ones of the pair of side cords extend off either side of the rubber ball passing through the side channels of the claw-shaped catch.

20. The assembly of claim 18, further comprising the toy including a rubber ball with an end cord; wherein, the rubber ball is held within the claw-shaped catch and the end cord extends off the rubber ball passing through the front channel of the claw-shaped catch.

* * * * *